US010769626B2

(12) United States Patent
Fourez et al.

(10) Patent No.: US 10,769,626 B2
(45) Date of Patent: Sep. 8, 2020

(54) METHOD AND SYSTEM FOR DISTRIBUTION, USE AND VALIDATION OF ELECTRONIC ENTITLEMENT CERTIFICATES

(71) Applicant: Mastercard International Incorporated, Purchase, NY (US)

(72) Inventors: Pablo Fourez, Scarsdale, NY (US); Alan Johnson, Maldon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 828 days.

(21) Appl. No.: 15/380,577

(22) Filed: Dec. 15, 2016

(65) Prior Publication Data
US 2017/0178128 A1    Jun. 22, 2017

Related U.S. Application Data

(60) Provisional application No. 62/268,845, filed on Dec. 17, 2015.

(51) Int. Cl.
*G06Q 20/38* (2012.01)
*H04L 29/06* (2006.01)
(Continued)

(52) U.S. Cl.
CPC ....... *G06Q 20/38215* (2013.01); *G06F 16/22* (2019.01); *G06F 16/2455* (2019.01);
(Continued)

(58) Field of Classification Search
None
See application file for complete search history.

(56) References Cited

U.S. PATENT DOCUMENTS 4,630,201 A * 12/1986 White .................... G06Q 20/04
235/379
5,677,955 A * 10/1997 Doggett ................. G06Q 20/02
235/379
(Continued)

FOREIGN PATENT DOCUMENTS

WO  WO-2008098163 A2 *  8/2008 ............. G06Q 20/04
WO     20150148850 A1    10/2015

OTHER PUBLICATIONS

A. Levi and C. K. Koc, "CONSEPP: CONvenient and secure electronic payment protocol based on X9.59," Seventeenth Annual Computer Security Applications Conference, New Orleans, LA, USA, 2001, pp. 286-295, doi: 10.1109/ACSAC.2001.991544. (Year: 2001).*

(Continued)

*Primary Examiner* — Jacob C. Coppola
(74) *Attorney, Agent, or Firm* — Buchanan Ingersoll & Rooney PC

(57) ABSTRACT

A method for distribution and transfer of entitlement certificates includes: storing account profiles, each account including an account identifier, primary account number, and account balance; receiving an entitlement request from a computing device including a specific account identifier, entitlement balance, and usage controls; identifying a specific account profile that includes the specific account identifier; generating an entitlement certificate that includes the entitlement balance and usage controls; generating an entitlement identifier for the entitlement certificate; placing a hold associated with the entitlement certificate on the account balance included in the specific account profile for the entitlement balance; and transmitting the entitlement certificate to the computing device.

6 Claims, 10 Drawing Sheets

(51) Int. Cl.
*G06F 16/22* (2019.01)
*G06F 16/2455* (2019.01)

(52) U.S. Cl.
CPC ......... *G06Q 20/38* (2013.01); *G06Q 20/3829* (2013.01); *H04L 63/0823* (2013.01)

(56) References Cited

U.S. PATENT DOCUMENTS

| | | | | |
|---|---|---|---|---|
| 6,477,513 | B1* | 11/2002 | Walker | G06Q 20/00 705/53 |
| 6,636,833 | B1 | 10/2003 | Flitcroft et al. | |
| 7,043,441 | B1* | 5/2006 | Maher | G06Q 20/00 705/33 |
| 7,136,835 | B1 | 11/2006 | Flitcroft et al. | |
| 7,359,880 | B2 | 4/2008 | Abel et al. | |
| 7,567,934 | B2 | 7/2009 | Flitcroft et al. | |
| 7,571,142 | B1 | 8/2009 | Flitcroft et al. | |
| 7,593,896 | B1 | 9/2009 | Flitcroft et al. | |
| 7,895,122 | B2 | 2/2011 | Flitcroft et al. | |
| 8,117,125 | B1* | 2/2012 | Kawan | G06Q 20/02 705/40 |
| 8,229,854 | B2 | 7/2012 | Stephen et al. | |
| 8,321,315 | B2 | 11/2012 | Abel et al. | |
| 8,510,218 | B2 | 8/2013 | Abel et al. | |
| 8,527,416 | B2 | 9/2013 | Flitcroft et al. | |
| 8,639,623 | B2 | 1/2014 | Kavanagh et al. | |
| 8,756,150 | B2 | 6/2014 | Flitcroft et al. | |
| 2002/0046335 | A1* | 4/2002 | Baum-Waidner | G06Q 20/02 713/156 |
| 2003/0074315 | A1* | 4/2003 | Lam | G06Q 20/042 705/42 |
| 2003/0115155 | A1* | 6/2003 | Doran | G06Q 20/04 705/75 |
| 2004/0059686 | A1* | 3/2004 | Levesque | G06Q 20/02 705/71 |
| 2004/0111375 | A1* | 6/2004 | Johnson | G06Q 20/06 705/64 |
| 2004/0199465 | A1* | 10/2004 | Nakada | G06Q 20/102 705/40 |
| 2005/0086467 | A1* | 4/2005 | Asokan | H04L 9/3263 713/155 |
| 2007/0219870 | A1* | 9/2007 | Ahlback | G06Q 20/04 705/26.41 |
| 2009/0210315 | A1* | 8/2009 | Jean | G06Q 20/12 705/26.1 |
| 2012/0066044 | A1* | 3/2012 | Honnef | G06Q 30/02 705/14.23 |
| 2013/0041773 | A1* | 2/2013 | Muse | G06Q 30/08 705/26.3 |
| 2015/0244690 | A1 | 8/2015 | Mossbarger | |
| 2015/0294413 | A1 | 10/2015 | Jonas | |
| 2017/0178128 | A1* | 6/2017 | Fourez | G06Q 20/38 |
| 2018/0019867 | A1* | 1/2018 | Davis | H04L 9/3239 |

OTHER PUBLICATIONS

U.S. Appl. No. 15/211,111, by Steven C. Davis, filed Jul. 15, 2016.
International Search Report and Written Opinion issued by the International Search Authority dated Mar. 23, 2017 in corresponding PCT Application No. PCT/US2016/066886 (15 pages).
Anonymous: "Blockchain—Wikipedia", Dec. 16, 2015 (Dec. 16, 2015), XP055354472, Retrieved from the Internet: URL: https://en.wikipedia.org/w/index.php?title=Blockchain&oldid=695550050 [retreived on Mar. 14, 2017] (5 Pages).

* cited by examiner

METHOD AND SYSTEM FOR DISTRIBUTION, USE AND VALIDATION OF ELECTRONIC ENTITLEMENT CERTIFICATES

FIELD

The present disclosure relates to the distribution, transfer, use, receipt, and validation of electronic entitlement certificates, specifically the use of entitlement certificates for conducting electronic transactions associated with a transaction account.

BACKGROUND

As the security and variety of available payment instruments increases, consumers have grown more and more accustomed to making purchases with transaction accounts via associated payment instruments in place of cash. Payment instruments offer greater convenience and security than cash does, as there is often only a single card or device that need be carried, and if the payment instrument is lost or stolen the consumer may be able to recover the instrument or receive a replacement without losing their money. As such, many consumers often prefer the use of payment instruments in place of cash.

However, there are instances where payment instruments may be less convenient than cash. For example, a person-to-person transfer of funds may be difficult, and in some instances impossible, to perform using traditional payment instruments. In addition, traditional payment instruments often require a working connection between the merchant or individual receiving a payment instrument and a payment network or financial institution associated therewith for processing the transaction. Furthermore, payment via a payment instrument may not be guaranteed for a merchant, as the funds may never end up being transferred to the merchant due to intermediate actions taken by the consumer. As such, there are instances where the use of cash may be beneficial over a payment instrument associated with a transaction account.

Thus, there is a need for an improved technological system where a payment instrument may be suitable for use in making guaranteed payments, person-to-person payments, and payments for transactions in instances where a recipient may lack a connection to a payment network or other payment processor. Such technological improvements may increase the utility of payment instruments to accommodate for some of the traditional advantages gained via cash purchases.

SUMMARY

The present disclosure provides a description of systems and methods for distribution, transfer, receipt, use, and validation of entitlement certificates.

A method for distribution and transfer of entitlement certificates includes: storing, in an account database of a processing server, a plurality of account profiles, wherein each account profile includes at least an account identifier, a primary account number, and an account balance; receiving, by a receiving device of the processing server, a data signal superimposed with an entitlement request from a computing device, wherein the entitlement request includes at least a specific account identifier, entitlement balance, and one or more usage controls; executing, by a querying module of the processing server, a first query on the account database to identify a specific account profile where the included primary account identifier corresponds to the specific account identifier; generating, by a generation module of the processing server, an entitlement certificate, wherein the entitlement certificate includes at least the entitlement balance and one or more usage controls; generating, by a generation module of the processing server, an entitlement identifier for the generated entitlement certificate; executing, by the querying module of the processing server, a second query on the account database to place a hold associated with the entitlement certificate on the account balance included in the specific account profile for at least the entitlement balance and insert the generated entitlement identifier into the specific account profile; and electronically transmitting, by a transmitting device of the processing server, a data signal superimposed with the entitlement certificate to the computing device.

A method for receipt and use of entitlement certificates includes: storing, in a memory of a computing device, a signature key; receiving, by a receiving device of the computing device, a data signal superimposed with an entitlement certificate, wherein the entitlement certificate includes at least an entitlement balance and one or more usage controls; signing, by a signing module of the computing device, the entitlement certificate using at least the stored signature key; executing, by a querying module of the computing device, a query on the memory to store the signed entitlement certificate; and electronically transmitting, by a transmitting device of the computing device, the signed entitlement certificate.

A method for receipt and validation of entitlement certificates includes: receiving, by a receiving device of a processing server, a transaction message related to a payment transaction via a payment network, wherein the transaction message is formatted based on one or more standards and includes at least a message type indicator indicative of an authorization request, a first data element configured to store a primary account number, and a second data element configured to store a transaction amount; receiving, by the receiving device of the processing server, at least one entitlement certificate, wherein each entitlement certificate includes at least an entitlement balance and one or more usage controls; generating, by a generation module of the processing server, a transaction message for each entitlement certificate, wherein each generated transaction message is formatted based on the one or more standards and includes at least a message type indicator indicative of a clearing record, a first data element configured to store the primary account number, and a second data element configured to store the entitlement balance included in the respective entitlement certificate; electronically transmitting, by a transmitting device of the processing server, each generated transaction message to a payment network; and processing, by a transaction processing module of the processing server, the payment transaction.

A system for distribution and transfer of entitlement certificates includes: a transmitting device of a processing server; an account database of the processing server configured to store a plurality of account profiles, wherein each account profile includes at least an account identifier, a primary account number, and an account balance; a receiving device of the processing server configured to receive a data signal superimposed with an entitlement request from a computing device, wherein the entitlement request includes at least a specific account identifier, entitlement balance, and one or more usage controls; a querying module of the processing server configured to execute a first query on the account database to identify a specific account profile where the included primary account identifier corresponds to the specific account identifier; and a generation module of the processing server configured to generate an entitlement certificate, wherein the entitlement certificate includes at least the entitlement balance and one or more usage controls, and an entitlement identifier for the generated entitlement certificate. The querying module of the processing server is further configured to execute a second query on the account database to place a hold associated with the entitlement certificate on the account balance included in the specific account profile for at least the entitlement balance and insert the generated entitlement identifier into the specific account profile. The transmitting device of the processing server is configured to electronically transmit a data signal superimposed with the entitlement certificate to the computing device.

A system for receipt and use of entitlement certificates includes: a memory of a computing device configured to store a signature key; a receiving device of the computing device configured to receive a data signal superimposed with an entitlement certificate, wherein the entitlement certificate includes at least an entitlement balance and one or more usage controls; a signing module of the computing device configured to sign the entitlement certificate using at least the stored signature key; a querying module of the computing device configured to execute a query on the memory to store the signed entitlement certificate; and a transmitting device of the computing device configured to electronically transmit the signed entitlement certificate.

A system for receipt and validation of entitlement certificates includes: a receiving device of a processing server configured to receive a transaction message related to a payment transaction via a payment network, wherein the transaction message is formatted based on one or more standards and includes at least a message type indicator indicative of an authorization request, a first data element configured to store a primary account number, and a second data element configured to store a transaction amount, and at least one entitlement certificate, wherein each entitlement certificate includes at least an entitlement balance and one or more usage controls; a generation module of the processing server configured to generate a transaction message for each entitlement certificate, wherein each generated transaction message is formatted based on the one or more standards and includes at least a message type indicator indicative of a clearing record, a first data element configured to store the primary account number, and a second data element configured to store the entitlement balance included in the respective entitlement certificate; a transmitting device of the processing server configured to electronically transmit each generated transaction message to a payment network; and a transaction processing module of the processing server configured to process the payment transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
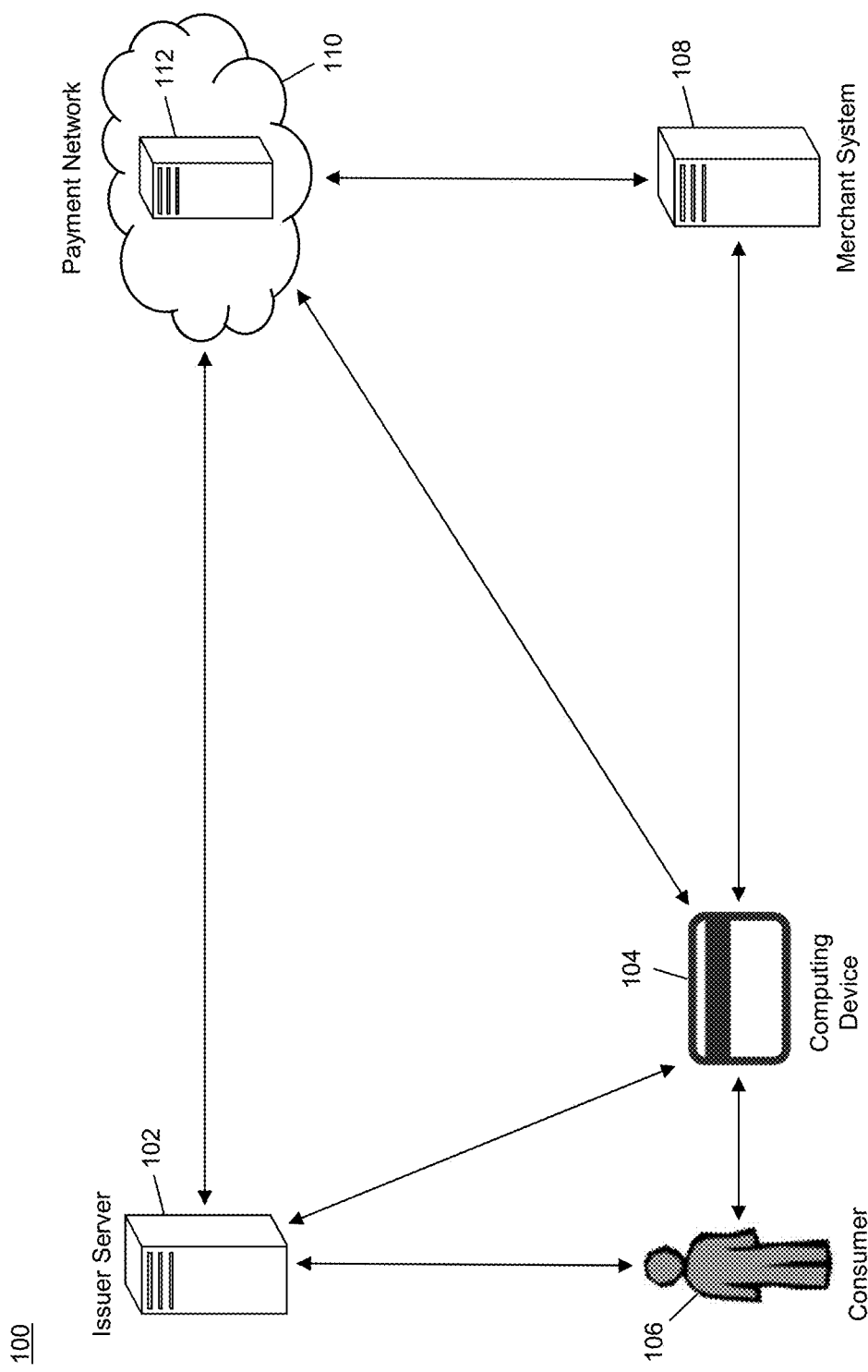
FIG. 1 is a block diagram illustrating a high level system architecture for the generation, distribution, transfer, use, and receipt of entitlement certificates for electronic transactions and monetary transfers in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Generation, Distribution, Validation, and Use of Entitlement Certificates FIG. 1 illustrates a system 100 for the generation, distribution, validation, and use of entitlement certificates via a payment instrument for use in electronic transactions for the money transfers.

The system 100 may include an issuer server 102. The issuer server 102, discussed in more detail below, may be part of a computing system of an issuing financial institution, such as an issuing bank, configured to create, storage, issuer, or otherwise manage financial transaction accounts for use in funding electronic transactions and money transfers. In the system 100, the issuer server 102 may issue a transaction account to a consumer 106 for use in funding electronic transactions. As part of the issuing of the transaction account, the issuer server 102 may issue payment credentials to a computing device 104 associated with the consumer 106.

In some instances, the issuer server 102 may issue the computing device 104 to the consumer 106, which may be a payment instrument configured to store payment details for conveyance to a merchant system 108 or other computing device for use in conveying funds as part of an electronic transaction or money transfer. In other instances, the issuer server 102 may issue payment credentials to a computing device 104 already possessed by the consumer 106, which may cause the computing device 104 to become a payment instrument once issued with the payment credentials. In each instance, the computing device 104, discussed in more detail below, may be configured to store payment credentials and perform the functions discussed herein for electronic transactions and money transfers via the use of entitlement certificates. The computing device 104 may be, for example, a payment card with an integrated circuit included therein, a mobile computing device (e.g., cellular phone, smart phone, smart watch, wearable computing device, implantable computing device, etc.) having an electronic wallet or other payment application program stored therein, or other suitable type of device.

To provide for guaranteed transactions, person-to-person money transfers, and offline transactions, the issuer server 102 may be configured to generate and distribute entitlement certificates to the computing device 104. An entitlement certificate may be an electronic certificate distributed to a computing device 104 for storage therein and transfer to another computing device that is serves as a guarantee of an associated currency amount for retrieval by an entity in possession of the entitlement certificate. The consumer 106 may request one or more entitlement certificates from the issuer server 102 using a suitable computing device, such as the computing device 104 in instances where the computing device 104 may be a suitable type of mobile communication device. In other instances, the consumer 106 may insert the computing device 104 into or otherwise interface the computing device 104 with a secondary computing device for submission of an entitlement certificate request to the issuer server 102, such as by interfacing an integrated circuit payment card with an automated teller machine in communication with the issuer server 102.

The entitlement certificate request may be electronically transmitted to the issuer server 102 via a suitable communication method and may include at least an account identifier, an entitlement balance, and one or more usage controls. The account identifier may be a value suitable for use in identifying the transaction account to be used as the source of funds for the electronic transaction or money transfer. The account identifier may be a primary account number for the related transaction account or other suitable value, such as an identification number, username, e-mail address, phone number, etc. The entitlement balance may be an amount guaranteed by the corresponding entitlement certificate. The one or more usage controls may include controls on the usage of the funds guaranteed by the corresponding entitlement certificate. Usage controls may include, for example, a control on where the funds may be used (e.g., at specific merchants, at specific types of merchants, in a person-to-person money transfer, in a specific geographic location or area, etc.) or how the funds may be used (e.g., for deposit only, for person-to-person transfer only, for withdrawal at an automated teller machine only, etc.). In some embodiments, an entitlement certificate request may also include a currency denomination, which may indicate the type of currency for the associated funds (e.g., the United States Dollar). Additional information regarding usage controls in payment transactions, and usage controls, generally, can be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. Pat. No. 7,359,880, issued Apr. 15, 2008; U.S. Pat. No. 7,895,122, issued Feb. 22, 2011; U.S. Pat. No. 8,229,854, issued Jul. 27, 2012; U.S. Pat. No. 8,321,315, issued Nov. 27, 2012; U.S. Pat. No. 8,510,218, issued Aug. 13, 2013; U.S. Pat. No. 8,639,623, issued Dec. 27, 2012; U.S. Pat. No. 8,756,150, issued Jun. 17, 2014; and U.S. Pat. No. 8,527,416, issued Sep. 3, 2013, each of which are herein incorporated by reference in their entirety.

The issuer server 102 may receive the entitlement certificate request and may generate one or more entitlement certificates based thereon. As discussed herein, "entitlement certificates" may also be referred to as "entitlement certificate units" or "ECUs." Each entitlement certificate may include at least the associated entitlement balance and one or more usage controls, as requested by the consumer 106. In some instances, the issuer server 102 may generate an identifier, for use in identifying the entitlement certificate or transactions associated therewith. In some cases, the identifier may be included in the entitlement certificate, or may accompany the entitlement certificate. In the latter cases, the identifier may be generated based on the entitlement certificate, such as by applying a hashing algorithm to the entitlement certificate. As part of the generation of an entitlement certificate, the issuer server 102 may be configured to place a hold on the related transaction account for the entitlement balance. The hold may be such that the associated funds (e.g., of the amount of the entitlement balance) cannot be used until a clearing record associated with the corresponding entitlement certificate is received, thus guaranteeing the associated funds.

The issuer server 102 may electronically transmit a data signal to the computing device 104 that is superimposed with the generated entitlement certificates. In some instances, the entitlement certificates may be directly transmitted to the computing device 104 from the issuer server 102. In other instances, the entitlement certificates may be transmitted through one or more intermediate entities or devices, such as a secondary computing device in communication with the computing device 104, such as an automated teller machine or point of sale device. The computing device 104 may receive the entitlement certificates and may store the certificates in a memory included therein.

In some embodiments, the computing device 104 may be configured to sign received entitlement certificates. The computing device 104 may store a signature key in a memory included therein, which may be used to digitally sign received entitlement certificates using a suitable signing algorithm and/or process. In some embodiments, the signature key may be a private key in a key pair, where the corresponding public key may be used in validation of the digital signatures generated therewith. In some embodiments, the computing device 104 may also be configured to generate a ledger of signed entitlement certificates. The ledger may consist of entries for each entitlement certificate received and signed by the computing device 104, which may be used in the validation of the signed entitlement certificates for use in guaranteed electronic transactions and money transfers. In some instances, the ledger may also indicate the sequence of receipt and distribution of entitlement certificates by the computing device 104.

Once one or more entitlement certificates are received by and stored in (e.g., and signed, if applicable) the computing device 104, the consumer 106 may present the computing device 104 to a merchant system 108 for use in funding an electronic transaction or money transfer. While it is illustrated in FIG. 1 and discussed herein that the computing device 104 may be used at a merchant system 108, it will be apparent to persons having skill in the relevant art that a second computing device 104 (e.g., which may also include entitlement certificates) or other suitable device (e.g., an automated teller machine) may be used in place of the merchant system 108 for participation in an electronic transaction or money transfer. For example, the merchant system 108 may be replaced by a payment instrument used in the receipt of a person-to-person money transfer or an automated teller machine where the computing device 104 may be used to deposit funds into a transaction account therewith.

The computing device 104 may be presented to the merchant system 108 and may electronically transmit at least one entitlement certificate to the merchant system 108 for use in an electronic transaction or money transfer. In instances where the computing device 104 may store a ledger, the ledger may also be electronically transmitted with the entitlement certificate(s) transmitted to the merchant system 108. The computing device 104 may also electronically transmit identification information, such as the ledger, a primary account number or other payment credentials, a payment token identifier or associated payment token, entitlement identifiers for the transmitted entitlement certificates, etc. In some cases, the computing device 104 may transmit enough entitlement certificates such that the aggregated entitlement balance covers a transaction amount for the electronic transaction or money transfer being conducted with the merchant system 108. The computing device 104 may update the ledger stored therein to indicate the transfer of the transmitted entitlement certificates to the merchant system 108. In some instances, the computing device 104 may delete or clear any ledger for which the associated entitlement certificate was transferred. The electronic transmission of data from the computing device 104 to the merchant system 108 may use any suitable method, such as via near field communication, Bluetooth, the reading of a magnetic stripe encoded in the computing device 104, the reading of a machine-readable code displayed by the computing device 104, transfer via contact to one or more contact points on the computing device 104, etc.

Once the merchant system 108 has received the entitlement certificates, the merchant system 108 may electronically transmit the entitlement certificates to a processing server 112 in a payment network 110. The transmission may also include identifying information associated with the computing device 104 or received entitlement certificates, such as a primary account number, one or more entitlement identifiers, or the ledger. In instances where the entitlement certificates may be provided as part of an electronic transaction (e.g., and not just a money transfer for the entitlement balances), the merchant system 108 may also provide transaction data, such as a transaction amount, for the electronic transaction. The processing server 112, discussed in more detail below, may be a part of the payment network 110 and may be configured to facilitate the clearing of entitlement certificates for release of guaranteed funds for payment in electronic transactions and money transfers.

The processing server 112 may be configured to validate the entitlement certificates provided by the merchant system 108. Validation may include the comparison of the entitlement certificates with the data contained in the ledger, such as to ensure chain of custody of the entitlement certificates and confirm availability of the associated funds. Validation may also include verifying compliance with the one or more usage controls included in the entitlement certificate, such as to ensure that the entitlement certificate is being used as required by the usage controls. In instances where entitlement certificates may be signed, validation may include verification of the digital signature for each of the entitlement certificates. In such instances, the processing server 102 may store a signature key used in the verification of the digital signature. In some embodiments, the signature key may be a public key in a key pair where the corresponding private key is the signature key used by the computing device 104 to sign the entitlement certificates.

Once the entitlement certificates have been validated, the processing server 102 may generate a clearing record corresponding to each entitlement certificate. The clearing record may be a transaction message that is formatted pursuant to one or more standards governing the exchange of financial transaction messages, such as the International Organization of Standardization's ISO 8583 standard, that includes a message type indicator indicating a type of the transaction message to be a clearing record, and that also includes a plurality of data elements. The data elements may store data as indicated by a bitmap included in the transaction message, such as having a data element configured to store the entitlement balance. In instances where an entitlement identifier may be received, a data element in the clearing record may store the associated entitlement identifier. In some cases, the clearing record may also include a data element indicating a payee for the associated entitlement balance, such as indicating a transaction account associated with the merchant system 108. The processing server 102 may electronically transmit each of the clearing records to the issuer server 102 via the payment network 110, such as using the payment rails.

The issuer server 102 may receive the clearing records, and may process the clearing records accordingly. The processing of a clearing record may include identification of the associated entitlement certificate that was distributed to the computing device 104 and release of the entitlement balance from the related transaction account. In instances where the entitlement balance is to be transferred, such as indicated in the clearing record, the issuer server 102 may initiate a transfer of the entitlement balance from the transaction account to the payee indicated in the clearing record, such as to the transaction account associated with the merchant system 108. Use of the entitlement certificate may therefore ensure that funds being paid to the merchant system 108 by the consumer via the computing device 104 are guaranteed, as the associated funds are held until a clearing record is received, the clearing record being initiated by the merchant system 108 providing the corresponding entitlement certificate. In addition, the entitlement certificate can ensure the guarantee of funds even in instances where the payment network 110 may be unavailable, as the funds may remain on hold until a connection with the payment network 110 is established for transmission of the corresponding entitlement certificate.

In some instances, entitlement certificates may be used in conjunction with an electronic transaction for a transaction amount greater than or equal to the entitlement balances of more than one entitlement certificate. For instance, the merchant system 108 may submit a transaction message (e.g., as formatted by and/or transmitted via one or more intermediate entities, such as an acquiring financial institution) for the electronic transaction to the processing server 112 via the payment network 110. The transaction message may include a message type indicator indicative of an authorization request and may include a data element configured to store the transaction amount for the transaction, as well as a data element configured to store the primary account number associated with the computing device 104, as may be provided by the computing device 104 to the merchant system 108 using traditional methods. The transaction message may be received by the processing server 112 and routed to the issuer server 102 via the payment network 110 using traditional methods. The issuer server 102 may receive the transaction message and may approve or deny the electronic transaction using traditional methods, where the amount of funds released via the clearing records corresponding to the entitlement balances may be considered in the approval or denial of the electronic transaction. The issuer server 102 may return a transaction message as an authorization response back to the processing server 112 via the payment network 110, which may be forwarded to the merchant system 108 for use in finalizing the transaction. Methods for the traditional processing of an electronic transaction using transaction messages are discussed in more detail below with respect to the process 900 illustrated in FIG. 9.

The use of entitlement certificates in conjunction with a transaction message for an electronic transaction may provide a guarantee as to the transaction amount being requested for transfer to the merchant associated with the merchant system 108. In such embodiments, the computing device 104 may provide the entitlement certificates to the merchant system 108 for forwarding to the processing server 112 via the payment network 110, which may be included in the transaction message or transmitted in a separate and/or accompanying data message. In other embodiments, the computing device 104 may directly transmit the entitlement certificates (e.g., and the ledger and any other additional data, such as entitlement identifiers) to the processing server 112 via the payment network 110 using the payment rails or a suitable, alternative communication network. In such embodiments, the transaction may be guaranteed via the use of entitlement certificates, without the need to modify existing merchant systems 108. In addition, because the entitlement certificates may serve as a guarantee for the associated entitlement balance, the merchant system 108 may finalize the electronic transaction without waiting for the processing of an associated transaction message, as the transaction amount is guaranteed, which may result in faster processing of transactions with consumers 106 via the entitlement certificates.

The use of entitlement certificates may thus provide for guaranteed electronic transactions and money transfers, which may be conducted absent a connection with a payment network 110 or other payment processor. In addition, person-to-person money transfers may also be easily conducted via the transfer of entitlement certificates from one computing device 104 to another. In such an instance, the transfer of an entitlement certificate to a second computing device 104 by a first computing device 104 may be recorded in a ledger in each computing device 104, which may be used by the processing server 112 in validation of the transfer once the ledgers and the entitlement certificate is transmitted to the processing server 112. In such instances, the clearing record generated by the processing server 112 and transmitted to the issuer server 102 may indicate the transaction account associated with the second computing device 104 as the payee for the entitlement balance.

In some embodiments, a computing device 104 may be configured to split an entitlement certificate into multiple entitlement certificates. For instance, in a person-to-person money transfer, a first computing device 104 may have an entitlement certificate corresponding to $20, but may wish to transfer $10 to a second computing device 104. In such an instance, the first computing device 104 may split the $20 entitlement certificate into two $10 entitlement certificates, and may record the operation in the ledger in the computing device 104. For example, the first computing device 104 may record the transfer out of the $20 entitlement certificate and the transfer in of two $10 entitlement certificates. In some such cases, the first computing device 104 may communicate with the issuer server 102 to turn in the $20 entitlement certificate and receive two $10 entitlement certificates in exchange. Once the $10 entitlement certificates have been obtained, the first computing device 104 may electronically transmit one of the $10 entitlement certificates to the second computing device 104. Similar methods of splitting and transfer may be used for other types of transactions, such as for the issuing of change to a computing device 104 from a merchant system 108 for a payment transaction funded via an entitlement certificate.

In some instances, the ledger maintained by the computing device 104 may be a record of receipt and transfer of all entitlement certificates thereby, and may implement a first-in, first-out system for the transfer and use of funds that are being managed via the ledger. As the entitlement certificates are transferred, the ledger, which may be represented by a chain of certificates, may also be recorded and transmitted along with the entitlement certificates. In cases where an entitlement certificate and ledger are transferred to another computing device 104 or other system (e.g., the merchant system 108) configured as discussed herein, the other computing device 104 or system may digitally sign the journal using an associated signature key. This may result in the ledger being a cryptographically secure transmitted ledger that itemizes each transaction that occurs, indicating the sequence of funds transfers and referencing all intermediary computing devices 104 and merchant systems 108. In addition, because the ledger is validated during a transaction, the ledger may also increase the security of funds transfers as it may be a trusted record of transactions from the original computing device 104 receiving the entitlement certificate to the final beneficiary of the entitlement balance. Further, the use of usage controls in conjunction with an entitlement certificate may ensure that only an authorized entity may make use of the corresponding entitlement balance, further increasing the security of the transfer.

In some embodiments, the ledger may be a blockchain. In such embodiments, the blockchain may be used to store the record of receipt and transfer of entitlement certificates. In some cases, the computing device 104 may be a node in a blockchain network configured to manage and store the blockchain. In other cases, the computing device 104 may communicate with a node in the blockchain network, such as to provide data associated with the receipt and transfer of entitlement certificates to such a node for addition into the associated blockchain. In these embodiments, the blockchain may be comprised of a plurality of blocks, where each block is comprised of at least a block header and a one or more transaction values. The block header may include at least a timestamp, a reference value to a prior block in the blockchain, and a reference value to the one or more transaction values included in the respective block. The reference values may be, for instance, hash values generated via hashing of the associated data. In cases where multiple transaction values are stored in a block, the reference value stored in the corresponding block header may be the root of a Merkle tree generated using the transaction values. In the system 100, transaction values may correspond to transfers of entitlement certificates, where each transaction value may include data associated with a specific entitlement certificate and transfer thereof. For example, a transaction value may indicate the transfer of a specific entitlement certificate (e.g., via its unique identifier) from one entity to another, such as may be indicated via unique addresses associated therewith. Additional information regarding blockchains, the addition of data thereto, and use of blockchains to securely store a ledger of data can be found in U.S. patent application Ser. No. 15/211,111, by Steven C. Davis, filed Jul. 15, 2016, which is herein incorporated by reference in its entirety.

In addition, because the issuer server 102 places a hold on the entitlement balance when an entitlement certificate is generated and distributed to the computing device 104, any money transfers involving the entitlement certificate may be performed in real-time. For example, a deposit made by the consumer 106 or other beneficiary of an entitlement certificate may result in the associated entitlement balance being available to the beneficiary in real-time, since the corresponding funds are guaranteed.

In some embodiments, limits may be placed on entitlement certificates and the transfer of funds associated therewith, such as based on governmental or other agency rules or regulations. For example, a limit may be placed on the amount of funds that may be transferred and/or guaranteed via entitlement certificates, how often funds may be transferred using entitlement certificates, how frequently entitlement certificates and/or ledgers must be provided to the processing server 112, charges to involved transaction accounts, etc. In some instances, such limits may be different for different entities involved in the system 100, such as different limits placed on the consumer 106 (e.g., and therefore the computing device 104) and the merchant system 108. In some embodiments, such limits may be set by the issuer server 102 and/or processing server 112 or payment network 110. In some cases, the computing device 104 may identify a status of the related transaction account or limits to be placed thereon, such as based on the transfer of the entitlement certificates (e.g., due to frequency, aggregated entitlement amounts, number of transfers, etc.).

Issuer Server

Figure 2:
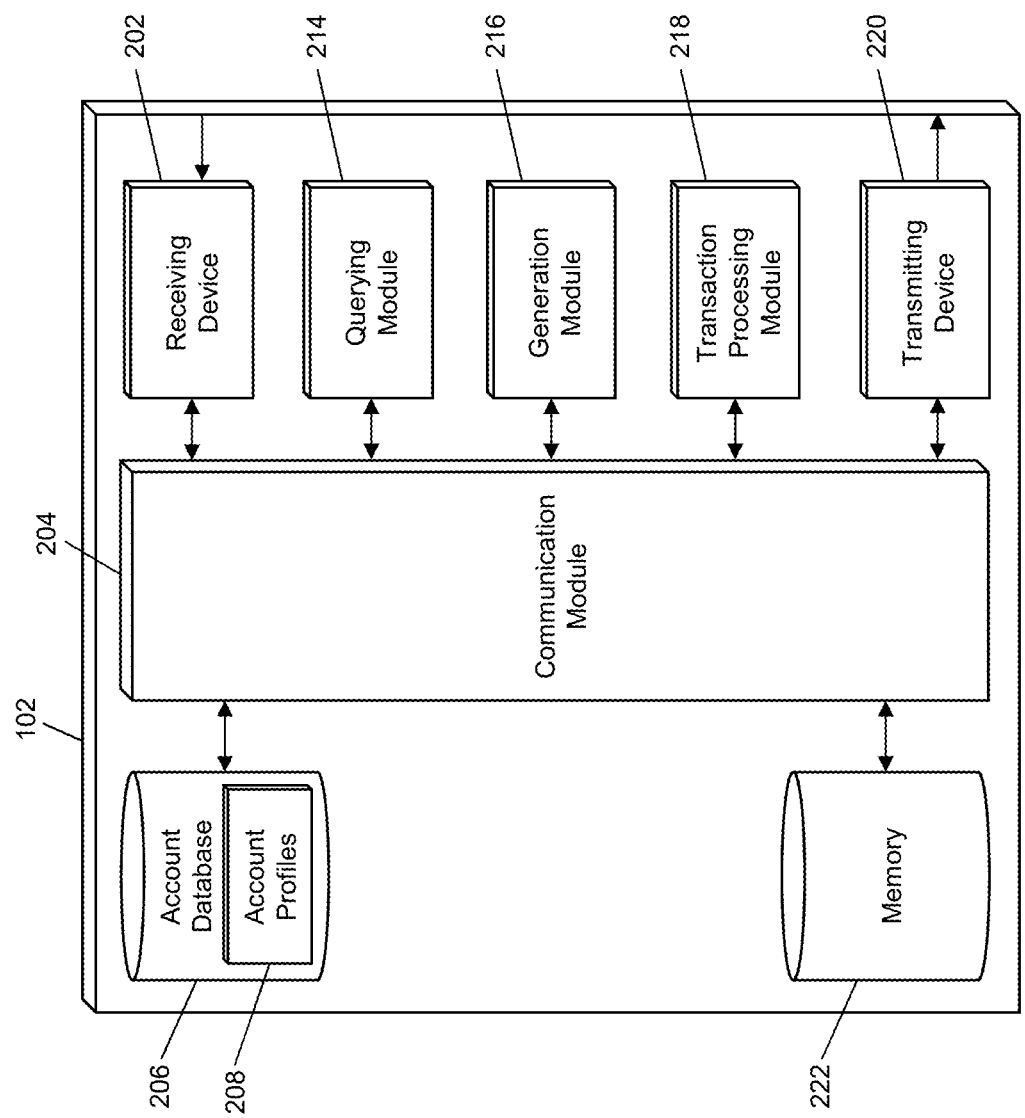
FIG. 2 is a block diagram illustrating the issuer server of FIG. 1 for the generation and distribution of entitlement certificates in accordance with exemplary embodiments.

FIG. 2 illustrates an embodiment of the issuer server 102 of the system 100. It will be apparent to persons having skill in the relevant art that the embodiment of the issuer server 102 illustrated in FIG. 2 is provided as illustration only and may not be exhaustive to all possible configurations of the issuer server 102 suitable for performing the functions as discussed herein. For example, the computer system 1000 illustrated in FIG. 10 and discussed in more detail below may be a suitable configuration of the issuer server 102.

The issuer server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 110 for the transmission of transaction messages that include sensitive financial data and information. In some instances, the receiving device 202 may also be configured to receive data from computing devices 104, merchant systems 108, payment networks 110, processing servers 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals from computing devices 104, which may be superimposed with entitlement certificate requests. Entitlement certificate requests may be requests for an entitlement certificate and may include an account identifier associated with the transaction account for which the certificate is requested, and an entitlement balance and one or more usage controls for the requested certificate. The receiving device 202 may also be configured to receive data signals from the processing server 112, which may be superimposed with transaction messages. The transaction messages may be formatted pursuant to one or more standard, such as the ISO 8583 standard, and may be authorization requests for electronic transactions or clearing records for clearing of entitlements. Transaction messages may include a plurality of data elements configured to store data therein associated with the related transaction, such as data elements configured to store transaction amounts, primary account numbers, entitlement certificates, entitlement identifiers, and additional transaction data, such as transaction times, transaction dates, geographic locations, merchant data, consumer data, point of sale data, issuer data, acquirer data, product data, reward data, loyalty data, offer data, etc.

The issuer server 102 may also include a communication module 204. The communication module 204 may be configured to transmit data between modules, engines, databases, memories, and other components of the issuer server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the issuer server 102 and external components of the issuer server 102, such as externally connected databases, display devices, input devices, etc. The issuer server 102 may also include a processing device. The processing device may be configured to perform the functions of the issuer server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The issuer server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. Each account profile 208 may include at least an account identifier, a primary account number, and an account balance. The account identifier may be a value suitable for use in identification of the respective account profile 208, which may be the same as or different from the primary account number. The primary account number may be the number associated with the related transaction account used in the processing of payment transactions for the transfer of funds from or to the related transaction account. The account balance may be a balance for the related transaction account. In some instances, an account profile 208 may also be configured to store usage controls applicable to the related transaction account, such that payment transactions or the use of entitlement certificates by the related transaction account may be subject to such usage controls.

The issuer server 102 may include a querying module 214. The querying module 214 may be configured to execute queries on databases to identify information. The querying module 214 may receive one or more data values or query strings, and may execute a query string based thereon on an indicated database, such as the account database 206, to identify information stored therein. The querying module 214 may then output the identified information to an appropriate engine or module of the issuer server 102 as necessary. The querying module 214 may, for example, execute a query on the account database 206 to an account profile 208 for which one or more entitlement certificates are requested. The account profile 208 may be identified, for instance, using the account identifier stored therein as corresponding to an account identifier included in an entitlement certificate request received by the receiving device 202.

The issuer server 102 may also include a generation module 216. The generation module 216 may be configured to receive instructions requesting the generation of data, may generate the data, and may then output the generated data to another module or engine of the issuer server 102. The generation module 216 may be configured to generate entitlement certificates based on data included in entitlement certificate requests received by the receiving device 202. Each entitlement certificate may include at least an entitlement balance and one or more usage controls. As part of the generation of the entitlement certificate, the generation module 216 may generate an instruction for execution by the querying module 214 to place a hold on the account balance in the related account profile 208 for the entitlement balance amount. The generation module 216 may output generated entitlement certificates to a transmitting device 220 for distribution.

The transmitting device 220 may be configured to transmit data over one or more networks via one or more network protocols. In some embodiments, the transmitting device 220 may be configured to transmit data over the payment rails, such as using specially configured infrastructure associated with payment networks 110 for the transmission of transaction messages that include sensitive financial data and information, such as identified payment credentials. In some instances, the transmitting device 220 may be configured to transmit data to computing devices 104, merchant systems 108, payment networks 110, processing servers 112, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to computing devices 104 that are superimposed with entitlement certificates. The transmitting device 220 may also be configured to electronically transmit data signals to the processing server 112 via the payment network 110, such as data signals superimposed with transaction messages and other data for use in processing payment transactions and money transfers.

The issuer server 102 may also include a transaction processing module 218. The transaction processing module 218 may be configured to perform the functions of the issuer server 102 suitable for the processing of electronic transactions, as will be apparent to persons having skill in the relevant art. For example, the transaction processing module 218 may identify clearing records and authorization responses and perform functions based thereon, such as instruct the querying module 214 to identify a related account profile 208, instruct the querying module 214 to release a hold on the account balance for a cleared entitlement record, approve or deny an electronic transaction based on an account balance and other criteria, make fraud determinations, etc.

The issuer server 102 may also include a memory 222. The memory 222 may be configured to store data for use by the issuer server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the issuer server 102 in the performance of the functions disclosed herein as will be apparent to persons having skill in the relevant art.

Computing Device

Figure 3:
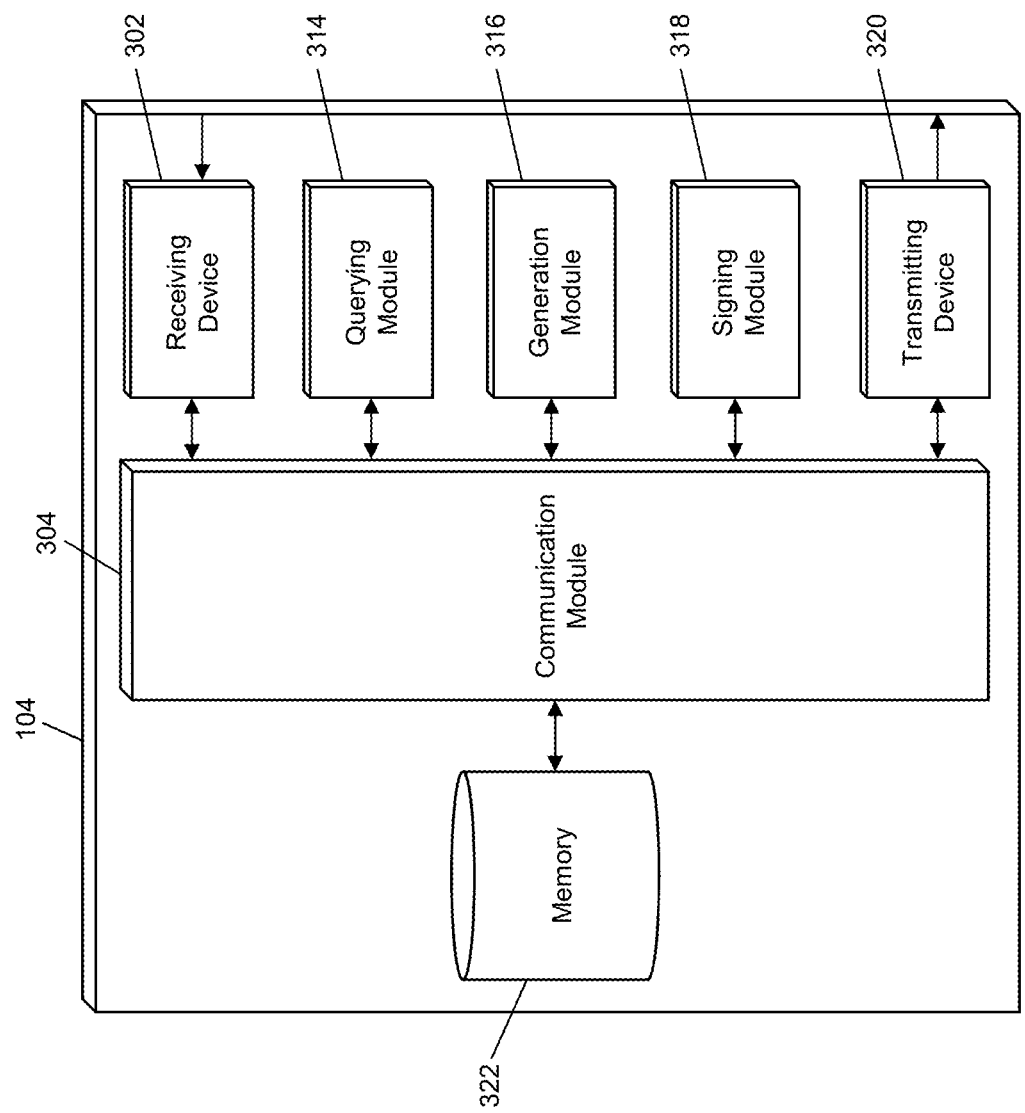
FIG. 3 is a block diagram illustrating the computing device of FIG. 1 for the receipt, signing, and distribution of entitlement certificates in accordance with exemplary embodiments.

FIG. 3 illustrates an embodiment of the computing device 104 of the system 100. It will be apparent to persons having skill in the relevant art that the embodiment of the computing device 104 illustrated in FIG. 3 is provided as illustration only and may not be exhaustive to all possible configurations of the computing device 104 suitable for performing the functions as discussed herein. For example, the computer system 1000 illustrated in FIG. 10 and discussed in more detail below may be a suitable configuration of the computing device 104.

The computing device 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 110 for the transmission of transaction messages that include sensitive financial data and information. In some instances, the receiving device 302 may also be configured to receive data from issuer servers 102, merchant systems 108, payment networks 110, processing servers 112, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals from issuer servers 102, which may be superimposed with entitlement certificates. Entitlement certificates may include at least an entitlement balance and one or more usage controls. In some instances, an entitlement certificate may include an entitlement identifier. The receiving device 302 may also be configured to receive data signals from merchant systems 108 or other computing devices, which may be superimposed with entitlement certificates. In such instances, the entitlement certificate may be transferred from another device and may be accompanied by a ledger, which may be a record of all transfers of the corresponding entitlement certificate. In some cases, entitlement certificates received from another computing device or merchant system 108 may be signed by the source.

The computing device 104 may also include a communication module 304. The communication module 304 may be configured to transmit data between modules, engines, databases, memories, and other components of the computing device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the computing device 104 and external components of the computing device 104, such as externally connected databases, display devices, input devices, etc. The computing device 104 may also include a processing device. The processing device may be configured to perform the functions of the computing device 104 discussed herein as will be apparent to persons having skill in the relevant art. In some embodiments, the processing device may include and/or be comprised of a plurality of engines and/or modules specially configured to perform one or more functions of the processing device, such as a querying module 314, generation module 316, signing module 318, etc. As used herein, the term "module" may be software or hardware particularly programmed to receive an input, perform one or more processes using the input, and provide an output. The input, output, and processes performed by various modules will be apparent to one skilled in the art based upon the present disclosure.

The computing device 104 may include a querying module 314. The querying module 314 may be configured to execute queries on databases to identify information. The querying module 314 may receive one or more data values or query strings, and may execute a query string based thereon on an indicated database, such as a memory 322, discussed below, to identify information stored therein. The querying module 314 may then output the identified information to an appropriate engine or module of the computing device 104 as necessary. The querying module 314 may, for example, execute a query on the memory 322 to store a received entitlement certificate therein, or to retrieve an entitlement certificate for transfer.

The computing device 104 may also include a generation module 316. The generation module 316 may be configured to receive instructions requesting the generation of data, may generate the data, and may then output the generated data to another module or engine of the computing device 104. The generation module 316 may be configured to generate a ledger for an entitlement certificate. The ledger may be a record of transfers for the entitlement certificate, and may be a newly generated ledger if the entitlement certificate is directly issued to the computing device 104 by the issuer server 102, or may be a modified ledger based on a ledger received by the receiving device 302 from another computing device or system. The generation module 316 may also be configured to generate instructions for modification to a ledger for execution by the querying module 314, such as to indicate an outbound transfer of an entitlement certificate for an electronic transaction or money transfer. The generation module 316 may also be configured to generate entitlement certificate requests, such as based on input or instructions provided by a user (e.g., the consumer 106), such as using one or more suitable input devices interfaced with the computing device 104 or received by the receiving device 302 from another device interface with the computing device 104, such as an automated teller machine or point of sale device.

The computing device 104 may also include a signing module 318. The signing module 318 may be configured to receive data, may sign the data, and may output the signed data to another engine or module of the computing device 104. In some embodiments, the signing module 318 may also receive a signature key and/or signature algorithm or method as input. In other embodiments, the signing module 318 may be configured to identify (e.g., via the querying module 314) a signature key and signature algorithm or method (e.g., from the memory 322) to use for signing. The signing module 318 may use a signing key to digitally sign an entitlement certificate or ledger according to a signing algorithm and/or method prior to transfer of the entitlement certificate or ledger. In some instances, the signature key may be a private key of a key pair.

The computing device 104 may also include a transmitting device 320. The transmitting device 320 may be configured to transmit data over one or more networks via one or more network protocols. In some embodiments, the transmitting device 320 may be configured to transmit data over the payment rails, such as using specially configured infrastructure associated with payment networks 110 for the transmission of transaction messages that include sensitive financial data and information, such as identified payment credentials. In some instances, the transmitting device 220 may be configured to transmit data to issuer servers 102, merchant systems 108, payment networks 110, processing servers 112, and other entities via alternative networks, such as the Internet. In some embodiments, the transmitting device 320 may be comprised of multiple devices, such as different transmitting devices for transmitting data over different networks, such as a first transmitting device for transmitting data over the payment rails and a second transmitting device for transmitting data over the Internet. The transmitting device 320 may electronically transmit data signals that have data superimposed that may be parsed by a receiving computing device. In some instances, the transmitting device 320 may include one or more modules for superimposing, encoding, or otherwise formatting data into data signals suitable for transmission.

The transmitting device 320 may be configured to electronically transmit data signals to issuer servers 102 that are superimposed with entitlement certificate requests. The transmitting device 302 may also be configured to electronically transmit data signals to other computing devices 104, merchant systems 108, and processing servers 112 that are superimposed with signed entitlement certificates and/or ledgers. In some instances, a ledger may be updated (e.g., and signed, if applicable) regarding transfer of an associated signed entitlement certificate prior to transfer of the ledger. Ledgers and entitlement certificates may be transmitted to computing devices 104, merchant systems 108, and processing servers 112 using any suitable communication method and network, which may include the payment rails associated with the payment network 110. In some instances, the computing device 104 may be configured to (e.g., via the querying module 314) delete or clear a ledger associated with an entitlement certificate upon transmission of the entitlement certificate. In some such instances, a determination to delete or clear or retain a ledger may be based on one or more rules or regulations, which may be based on any suitable criteria, such as a geographic location or destination of the entitlement certificate.

The computing device 104 may also include a memory 322. The memory 322 may be configured to store data for use by the computing device 104 in performing the functions discussed herein. The memory 322 may be configured to store data using suitable data formatting methods and schema and may be any suitable type of memory, such as a read-only memory, random access memory, etc. The memory 322 may include, for example, encryption keys and algorithms, communication protocols and standards, data formatting standards and protocols, program code for modules and application programs of the processing device, and other data that may be suitable for use by the computing device 104 in the performance of the functions disclosed herein as will be apparent to persons having skill in the relevant art. For instance, the memory 322 may be configured to store signed and unsigned entitlement certificates, ledgers, signature keys, payment credentials, etc.

Processing Server

Figure 4:
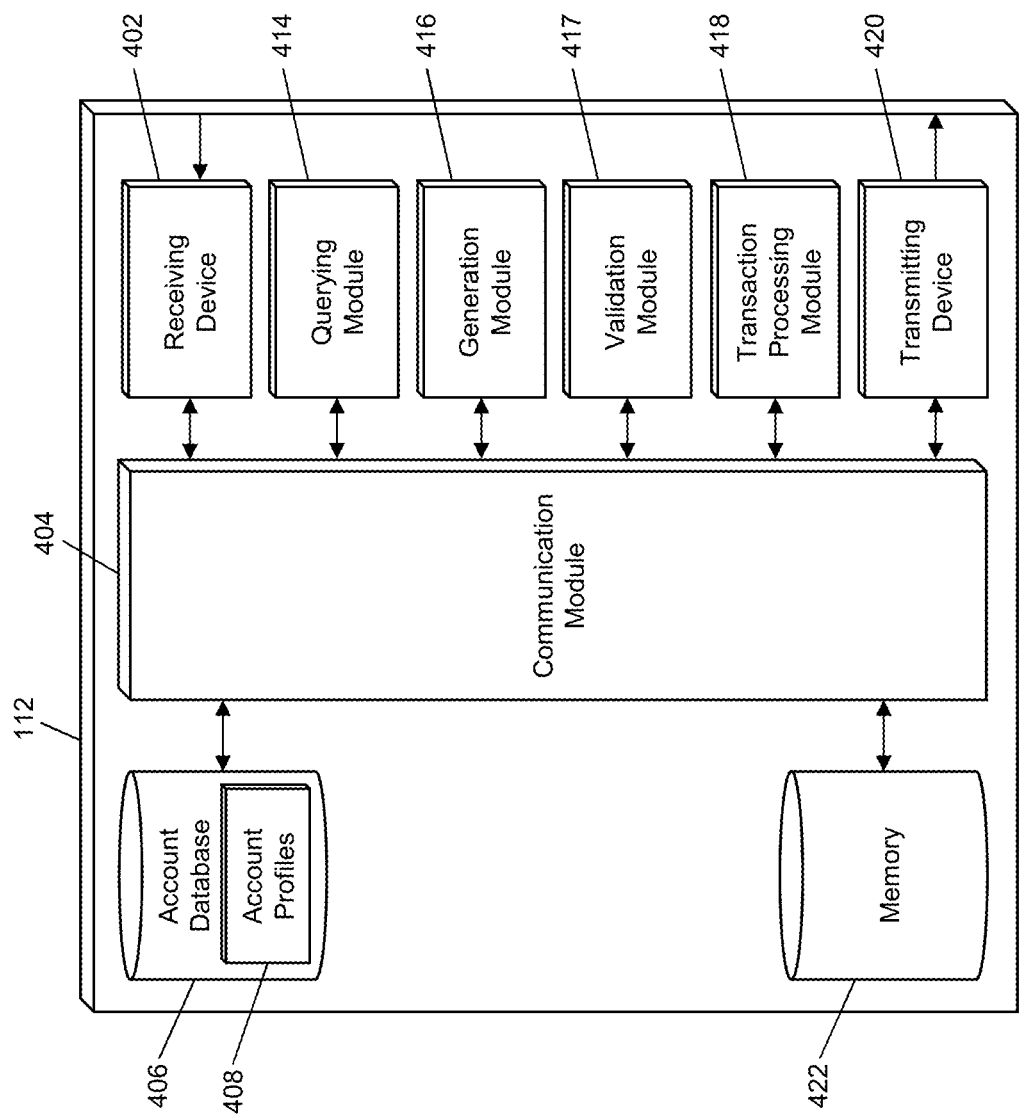
FIG. 4 is a block diagram illustrating the processing server of FIG. 1 for the receipt, validation, and use of entitlement certificates in accordance with exemplary embodiments.

FIG. 4 illustrates an embodiment of the processing server 112 of the system 100. It will be apparent to persons having skill in the relevant art that the embodiment of the processing server 112 illustrated in FIG. 4 is provided as illustration only and may not be exhaustive to all possible configurations of the processing server 112 suitable for performing the functions as discussed herein. For example, the computer system 1000 illustrated in FIG. 10 and discussed in more detail below may be a suitable configuration of the processing server 112.

The processing server 112 may include a receiving device 402. The receiving device 402 may be configured to receive data over one or more networks via one or more network protocols. In some embodiments, the receiving device 402 may be configured to receive data over the payment rails, such as using specially configured infrastructure associated with payment networks 110 for the transmission of transaction messages that include sensitive financial data and information. In some instances, the receiving device 402 may also be configured to receive data from issuer servers 102, computing devices 104, merchant systems 108, payment networks 110, and other entities via alternative networks, such as the Internet. In some embodiments, the receiving device 402 may be comprised of multiple devices, such as different receiving devices for receiving data over different networks, such as a first receiving device for receiving data over payment rails and a second receiving device for receiving data over the Internet. The receiving device 402 may receive electronically data signals that are transmitted, where data may be superimposed on the data signal and decoded, parsed, read, or otherwise obtained via receipt of the data signal by the receiving device 402. In some instances, the receiving device 402 may include a parsing module for parsing the received data signal to obtain the data superimposed thereon. For example, the receiving device 402 may include a parser program configured to receive and transform the received data signal into usable input for the functions performed by the processing device to carry out the methods and systems described herein.

The receiving device 402 may be configured to receive data signals from computing devices 104 and merchant systems 108 that may be superimposed with entitlement certificates. The entitlement certificates may include at least an entitlement balance and one or more usage controls. In some instances an entitlement certificate may include or may be accompanied with an identification value, such as an entitlement identifier or other value associated with the entitlement certificate, or a value associated with the related transaction account, such as an account identifier, primary account number, or payment token identifier. In some instances, the entitlement certificates may be accompanied by a ledger, or the receiving device 402 may otherwise receive data signals from computing devices 104 and merchant systems 108 superimposed with ledgers. A ledger may be associated with an entitlement certificate and may be a record of transfers of the associated entitlement certificate.

The receiving device 402 may also be configured to receive data signals from merchant systems 108 that are superimposed with transaction messages for payment transactions, which may be formatted pursuant to one or more standards, such as the ISO 8583 standard, and include a plurality of data elements configured to store data therein associated with the related transaction, such as data elements configured to store transaction amounts, primary account numbers, entitlement certificates, entitlement identifiers, and additional transaction data, such as transaction times, transaction dates, geographic locations, merchant data, consumer data, point of sale data, issuer data, acquirer data, product data, reward data, loyalty data, offer data, etc. In some instances, a transaction message may include an entitlement certificate and/or ledger.

The processing server 112 may also include a communication module 404. The communication module 204 may be configured to transmit data between modules, engines, databases, memories, and other components of the processing server 112 for use in performing the functions discussed herein. The communication module 404 may be comprised of one or more communication types and utilize various communication methods for communications within a computing device. For example, the communication module 404 may be comprised of a bus, contact pin connectors, wires, etc. In some embodiments, the communication module 404 may also be configured to communicate between internal components of the processing server 112 and external components of the processing server 112, such as externally connected databases, display devices, input devices, etc. The processing server 112 may also include a processing device. The processing device may be configured to perform the functions of the processing server 112 discussed herein as will be apparent to persons having skill in the relevant art. In some embodiments, the processing device may include and/or be comprised of a plurality of engines and/or modules specially configured to perform one or more functions of the processing device, such as a querying module 414, generation module 416, validation module 417, transaction processing module 418, etc. As used herein, the term "module" may be software executed on hardware or hardware particularly programmed to receive an input, perform one or more processes using the input, and provide an output. The input, output, and processes performed by various modules will be apparent to one skilled in the art based upon the present disclosure.

The processing server 112 may include an account database 406. The account database 406 may be configured to store a plurality of account profiles 408 using a suitable data storage format and schema. The account database 406 may be a relational database that utilizes structured query language for the storage, identification, modifying, updating, accessing, etc. of structured data sets stored therein. Each account profile 408 may be a structured data set configured to store data related to a transaction account. Each account profile 408 may include data associated with the related transaction account, such as a signature key used in verifying entitlement certificates signed by a related computing device 104. The signature key may be a public key of a key pair where the related computing device 104 uses the corresponding private key to sign an entitlement certificate and/or ledger to be validated. An account profile 408 may also include past ledgers or entitlement certificates associated with the related transaction account for use in future validations and verifications. Each account profile 408 may include information for use in the identification thereof, such as an account identifier, primary account number, or payment token identifier. In some cases, an account profile 408 may be configured to store data associated with the entitlement certificates that are associated with the related transaction account, such as usage controls. In some instances, the account profile 408 may also include usage controls directly associated with the related transaction account, where entitlement certificates issued to the transaction account may be subject to such controls, in addition to any controls applicable directly to the entitlement certificate.

The processing server 112 may include a querying module 414. The querying module 414 may be configured to execute queries on databases to identify information. The querying module 414 may receive one or more data values or query strings, and may execute a query string based thereon on an indicated database, such as the account database 406, to identify information stored therein. The querying module 414 may then output the identified information to an appropriate engine or module of the processing server 112 as necessary. The querying module 414 may, for example, execute a query on the account database 406 to identify an account profile 408 related to a received entitlement request or transaction message, which may be identified via an account identifier, primary account number, or payment token identifier provided therewith. In some instances, the identification value may be included in the entitlement request or in a corresponding data element in the transaction message.

The processing server 112 may also include a generation module 416. The generation module 416 may be configured to receive instructions requesting the generation of data, may generate the data, and may then output the generated data to another module or engine of the processing server 112. The generation module 416 may be configured to generate clearing records associated with entitlement certificates. A clearing record may be a transaction message formatted pursuant to one or more standards, such as the ISO 8583 standard, that includes a message type indicator indicative of a clearing record, that includes at least a data element configured to store a clearing amount corresponding to the entitlement balance of the related entitlement certificate and a data element configured to store the identification value associated with the related entitlement certificate, which may be an entitlement identifier or an account identifier, primary account number, or payment token identifier corresponding to the related transaction account.

The processing server 112 may also include a validation module 417. The validation module 417 may be configured to receive data to be validated, may validate the data, and may output a result of the validation to another module or engine of the processing server 112. The validation module 417 may, for example, validate a signed entitlement certificate or ledger by verifying the digital signature via the use of a signature key stored in the related account profile 408 (e.g., as identified via the querying module 414). The validation module 417 may also be configured to validate an entitlement certificate as being used in accordance with the one or more usage controls associated therewith, or associated with an applicable transaction account, such as by verifying that the merchant system 108 or computing device 104 providing the entitlement certificate for receipt of the associated funds is authorized by the usage controls. In some instances, the validation module 417 may also validate an entitlement certificate against the corresponding ledger, such as to ensure proper chain of custody and transfer.

The processing server 112 may include a transmitting device 420. The transmitting device 420 may be configured to transmit data over one or more networks via one or more network protocols. In some embodiments, the transmitting device 420 may be configured to transmit data over the payment rails, such as using specially configured infrastructure associated with payment networks 110 for the transmission of transaction messages that include sensitive financial data and information, such as identified payment credentials. In some instances, the transmitting device 420 may be configured to transmit data to issuer servers 102, computing devices 104, merchant systems 108, payment networks 110, and other entities via alternative networks, such as the Internet. In some embodiments, the transmitting device 420 may be comprised of multiple devices, such as different transmitting devices for transmitting data over different networks, such as a first transmitting device for transmitting data over the payment rails and a second transmitting device for transmitting data over the Internet. The transmitting device 420 may electronically transmit data signals that have data superimposed that may be parsed by a receiving computing device. In some instances, the transmitting device 420 may include one or more modules for superimposing, encoding, or otherwise formatting data into data signals suitable for transmission.

The transmitting device 420 may be configured to electronically transmit data signals to issuer servers 102 via the payment network 110 that are superimposed with clearing records for the release and payment of guaranteed funds associated with entitlement certificates. The transmitting device 420 may also be configured to electronically transmit data signals superimposed with other transaction messages to issuer servers 102 and merchant systems 108 for use in additional processes related to the processing of electronic transactions and money transfers as will be apparent to persons having skill in the relevant art.

The processing server 112 may also include a transaction processing module 418. The transaction processing module 418 may be configured to perform the functions of the processing server 112 suitable for the processing of electronic transactions, as will be apparent to persons having skill in the relevant art. For example, the transaction processing module 418 may validate authorization requests, identify associated financial institutions, route transaction messages, perform fraud score calculations, apply transaction controls, etc.

The processing server 112 may also include a memory 422. The memory 422 may be configured to store data for use by the processing server 112 in performing the functions discussed herein. The memory 422 may be configured to store data using suitable data formatting methods and schema and may be any suitable type of memory, such as read-only memory, random access memory, etc. The memory 422 may include, for example, encryption keys and algorithms, communication protocols and standards, data formatting standards and protocols, program code for modules and application programs of the processing device, and other data that may be suitable for use by the processing server 112 in the performance of the functions disclosed herein as will be apparent to persons having skill in the relevant art.

Processing an Electronic Transaction Via Entitlement Certificates

Figure 5:
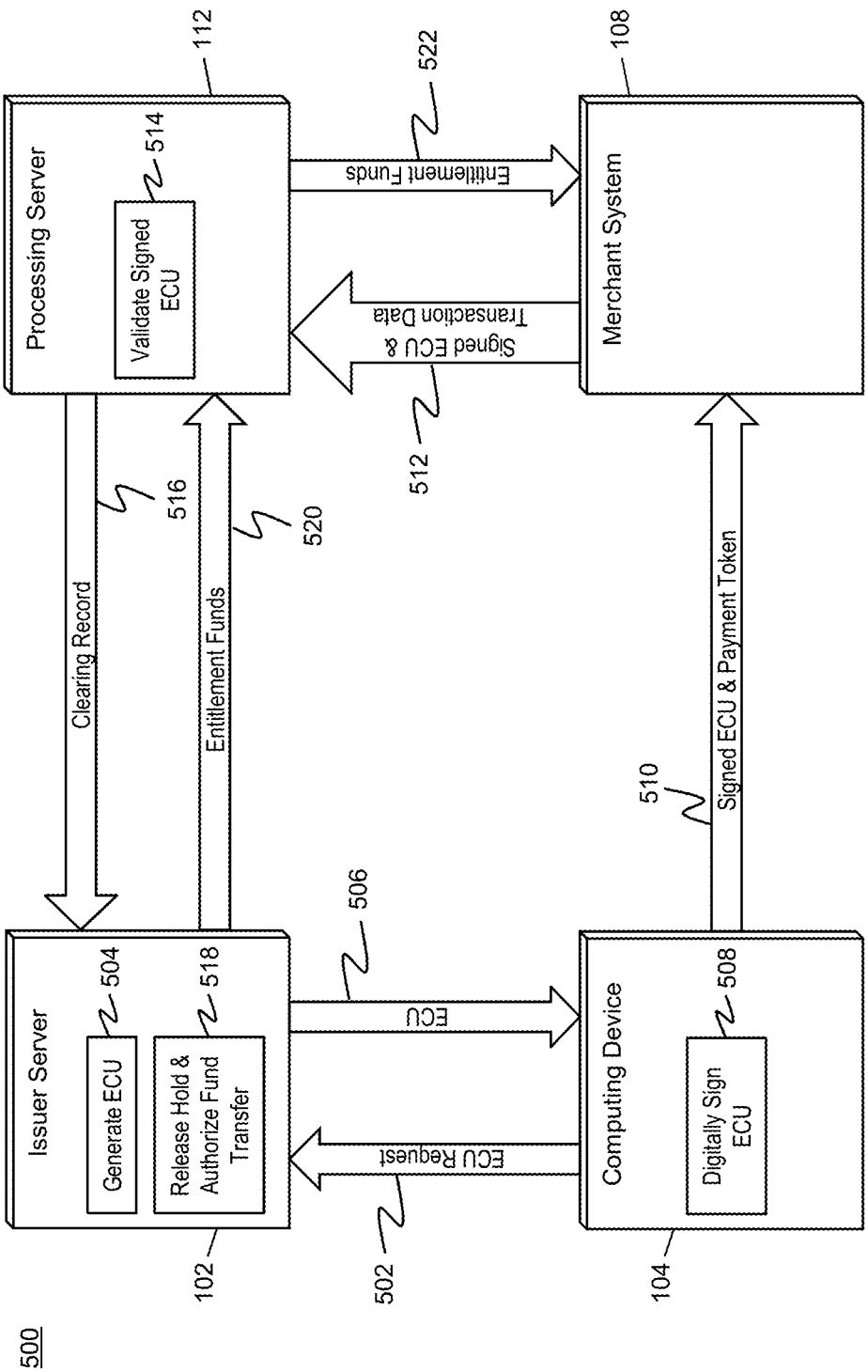
FIG. 5 is a flow diagram illustrating a process for the distribution and use of entitlement certificates in the system of FIG. 1 in accordance with exemplary embodiments.

FIG. 5 illustrates the processing of an electronic transaction for the transfer of funds associated with a computing device 104 to a merchant system 108 via the use of entitlement certificates.

In step 502, a data signal may be electronically transmitted from the computing device 104 (e.g., by the transmitting device 320) to the issuer server 102 (e.g., received by the receiving device 202) via a suitable communication network that is superimposed with an entitlement certificate request. The entitlement certificate request may include at least an account identifier associated with the transaction account for which the entitlement certificate is requested, an entitlement balance, and one or more usage controls. In some instances, the account identifier may be a primary account number or payment token identifier associated with payment credentials corresponding to the transaction account stored in the computing device 104.

In step 504, the generation module 216 of the issuer server 102 may generate an entitlement certificate based on the received entitlement certificate request. The entitlement certificate may include at least the entitlement balance and one or more usage controls. In some instances, the generation module 416 may generate an entitlement identifier for storage in or to accompany the entitlement certificate. As part of the generation process, the querying module 214 of the issuer server 102 may execute a query on the account profile 208 related to the transaction account for which the entitlement certificate is generated to place a hold on an account balance included in the account profile 208 for an amount of the entitlement balance. In some instances, the transaction processing module 218 of the issuer server 102 may verify that the account balance in the account profile 208 is sufficient to cover the requested entitlement balance.

In step 506, the transmitting device 220 of the issuer server 102 may electronically transmit the generated entitlement certificate to the computing device 104 via superimposition on a data signal transmitted using a suitable communication network, such as a cellular network, a radio frequency network, the Internet, the payment network 110, etc. The receiving device 302 of the computing device 104 may receive the entitlement certificate and, in step 508, the signing module 318 of the computing device 104 may digitally sign the entitlement certificate. In some instances, the entitlement certificate may be digitally signed using a signature key stored in a memory 322 of the computing device 104 and may be signed using a suitable signing algorithm and/or process. In some cases, the generation module 316 of the computing device 104 may generate a ledger that stores a record of the receipt of the entitlement certificate from the issuer server 102. In some instances, the ledger may also indicate that the entitlement certificate was signed and/or the ledger itself may be signed by the signing module 318.

In step 510, the transmitting device 320 of the computing device 104 may electronically transmit a data signal superimposed with at least the signed entitlement certificate to the merchant system 108 using a suitable communication method. In some instances, the data signal may also be superimposed with the associated ledger. In some such instances, the ledger may be first be updated by the computing device 104 to indicate the transfer of the signed entitlement certificate to the merchant system 108. In some cases, the entitlement certificate may include or be accompanied with an identification value, such as an entitlement identifier, account identifier, primary account number, or payment token identifier. The merchant system 108 may receive the entitlement certificate and any associated data and may forward the information to the processing server 112 via the payment network 110. In some instances, the data may be included in or may accompany a transaction message for a payment transaction. In such instances, the transaction message may include a message type indicator indicative of an authorization request and a data element configured to store the identification value associated with the entitlement identifier.

The receiving device 402 of the processing server 112 may receive the entitlement certificate and other associated data, and, in step 514, the validation module 417 of the processing server 112 may validate the signed entitlement certificate. Validation may include verification of the digital signature of the entitlement certificate, which may utilize a signature key associated with the related transaction account (e.g., which may be a public key corresponding to a private key used by the computing device 104 for the signature), as well as verification of any accompanying data, such as the ledger or a transaction message. For instance, data stored in the transaction message may be verified to ensure that the one or more usage controls included in the entitlement certificate are complied with. Successful validation of the entitlement certificate may result in the generation of a clearing record for the entitlement certificate by the generation module 416 of the processing server 112. The clearing record may be a transaction message formatted pursuant to one or more standards, such as the ISO 8583 standard that includes a message type indicator indicative of a clearing record, a data element configured to store the identification value associated with the entitlement certificate, and a data element configured to store the entitlement balance included in the entitlement certificate. The clearing record may also include a data element configured to store a payee account number corresponding to a transaction account for receipt of the entitled funds, such as a transaction account associated with the merchant system 108.

In step 516, the transmitting device 420 of the processing server 112 may electronically transmit a data signal superimposed with the clearing record to the issuer server 102 via the payment network 110. The receiving device 202 of the issuer server 102 may receive the clearing record. In step 518, the transaction processing module 218 of the issuer server 102 may instruct the querying module 214 of the issuer server 102 to execute a query to release the hold on the entitlement balance in the account profile 208 related to the transaction account (e.g., identified via the identification value stored in the corresponding data element included in the clearing record) and may authorize a transfer of the entitlement balance from the transaction account related to the account profile 208 to the transaction account corresponding to the payee account number stored in the corresponding data element included in the clearing record. As a result of the authorization, in steps 520 and 522 the entitlement funds may be transferred to the merchant system 108 from the issuer server 102.

Exemplary Method for Distribution and Transfer of Entitlement Certificates

Figure 6:
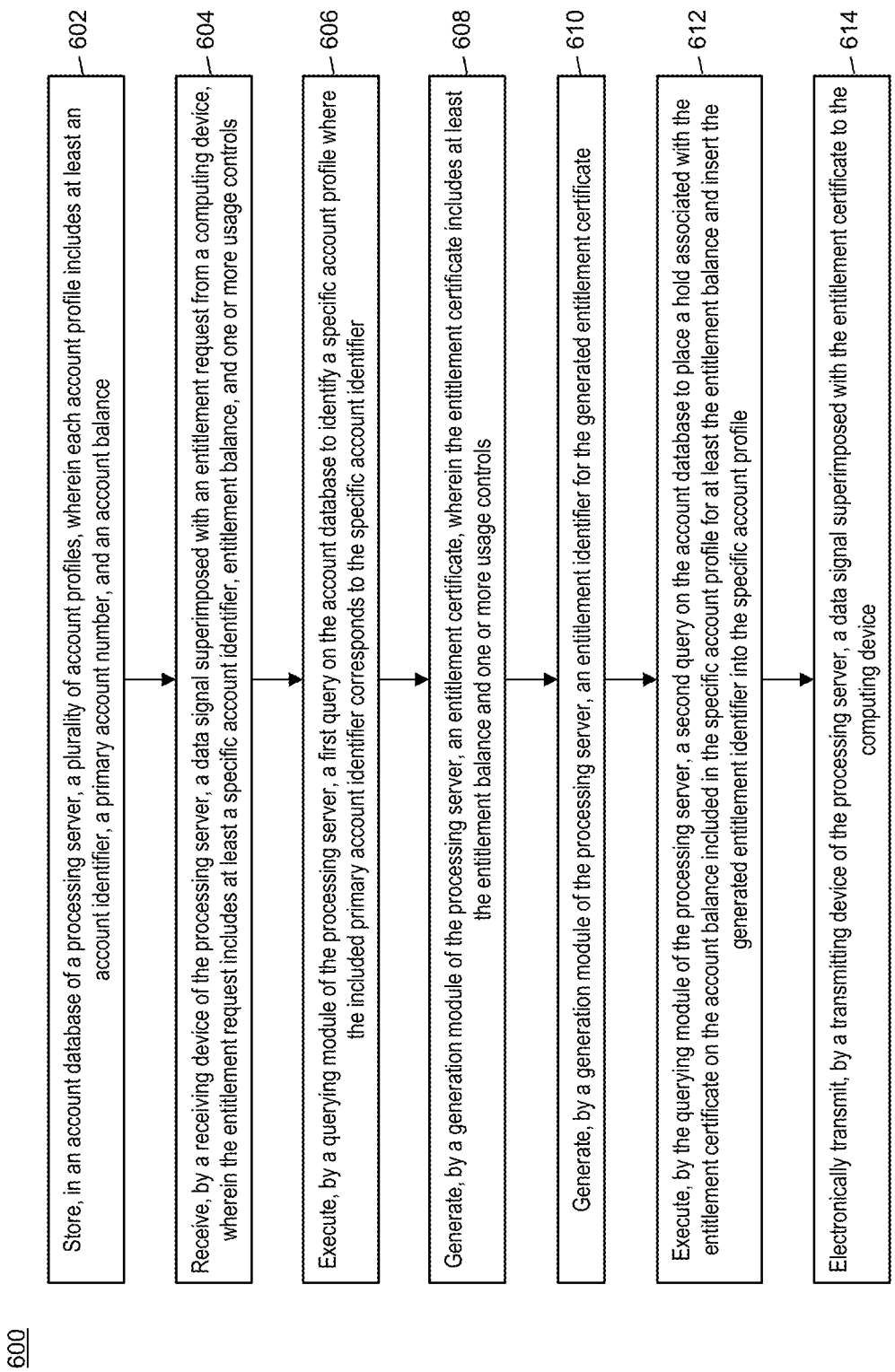
FIG. 6 is a flow chart illustrating an exemplary method for distribution and transfer of entitlement certificates in accordance with exemplary embodiments.

FIG. 6 illustrates a method 600 for the distribution and transfer of entitlement certificates from an issuer server 102 to a computing device 104 for use in electronic transactions and money transfers.

In step 602, a plurality of account profiles (e.g., account profiles 208) may be stored in an account database (e.g., the account database 206) of a processing server (e.g., the issuer server 102), wherein each account profile includes at least an account identifier, a primary account number, and an account balance. In step 604, a data signal superimposed with an entitlement request may be received by a receiving device (e.g., the receiving device 202) of the processing server from a computing device (e.g., the computing device 104), wherein the entitlement request includes at least a specific account identifier, entitlement balance, and one or more usage controls.

In step 606, a first query may be executed by a querying module (e.g., the querying module 214) of the processing server on the account database to identify a specific account profile where the included primary account identifier corresponds to the specific account identifier. In step 608, an entitlement certificate may be generated by a generation module (e.g., the generation module 216) of the processing server, wherein the entitlement certificate includes at least the entitlement balance and one or more usage controls.

In step 610, a second query may be executed by the querying module of the processing server on the account database to place a hold associated with the entitlement certificate on the account balance included in the specific account profile for at least the entitlement balance and insert the generated entitlement identifier into the specific account profile. In step 612, a data signal superimposed with the entitlement certificate may be electronically transmitted by a transmitting device (e.g., the transmitting device 220) of the processing server to the computing device.

In one embodiment, the method 600 may also include: receiving, by the receiving device of the processing server, a transaction message via a payment network (e.g., the payment network 110), wherein the transaction message is formatted based on one or more standards and includes at least a message type indicator indicative of a clearing record, a first data element configured to store the primary account number included in the specific account profile, and a second data element configured to store the generated entitlement identifier; and executing, by the querying module of the processing server, a third query on the account profile to release the hold associated with the entitlement certificate on the account balance. In another embodiment, the entitlement identifier may be generated via application of one or more hashing algorithms to the generated entitlement certificate.

Exemplary Method for Receipt and Use of Entitlement Certificates

Figure 7:
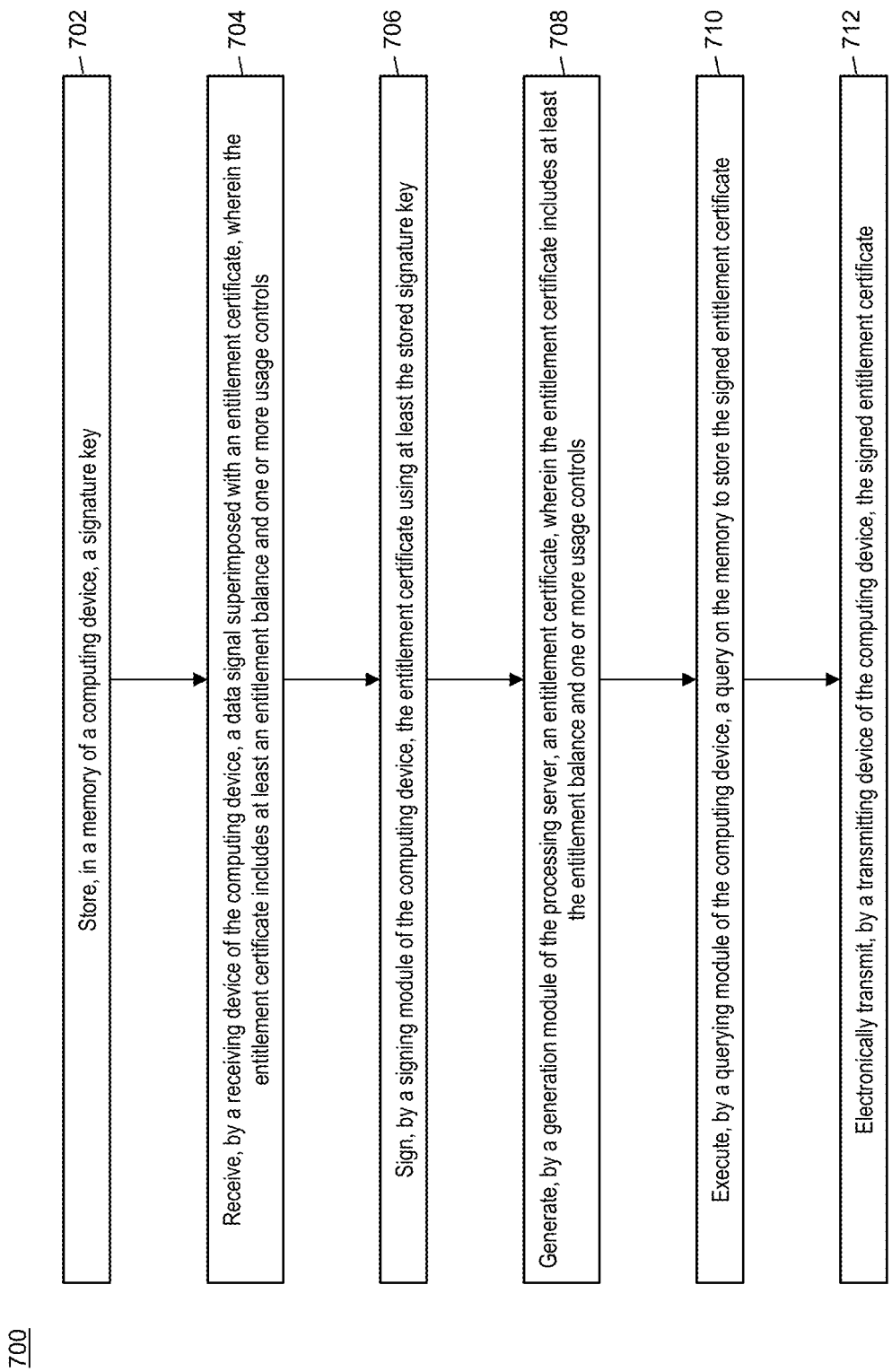
FIG. 7 is a flow chart illustrating an exemplary method for receipt and use of entitlement certificates in accordance with exemplary embodiments.

FIG. 7 illustrates a method 700 for the receipt and use of entitlement certificates in electronic transactions and money transfers by a computing device 104.

In step 702, a signature key may be stored in a memory (e.g., the memory 322) of a computing device (e.g., the computing device 104). In step 704, a data signal superimposed with an entitlement certificate may be received by a receiving device (e.g., the receiving device 302) of the computing device, wherein the entitlement certificate includes at least an entitlement balance and one or more usage controls.

In step 706, the entitlement certificate may be signed by a signing module (e.g., the signing module 318) of the computing device using at least the stored signature key. In step 708, a query may be executed by a querying module (e.g., the querying module 314) of the computing device on the memory to store the signed entitlement certificate. In step 710, the signed entitlement certificate may be electronically transmitted by a transmitting device (e.g., the transmitting device 320) of the computing device.

In one embodiment, the method 700 may also include: receiving, by the receiving device of the computing device, a second data signal superimposed with a second entitlement certificate, wherein the second entitlement certificate includes at least an entitlement balance and one or more usage controls; signing, by the signing module of the computing device, the second entitlement certificate using at least the stored signature key; generating, by a generation module (e.g., the generation module 316) of the computing device, a ledger, wherein the ledger comprises at least the signed entitlement certificate and the signed second entitlement certificate; and executing, by the querying module of the computing device, a second query on the memory to store the signed second entitlement certificate and generated ledger. In a further embodiment, transmitting the signed entitlement certificate may further include transmitting at least the generated ledger. In another further embodiment, the generation module of the computing device may generate a separate ledger for each entitlement certificate comprising the respective entitlement certificate.

In some embodiments, the method 700 may also include generating, by the generation module of the computing device, a ledger comprising at least the signed entitlement certificate. In one embodiment, the method 700 may further include: generating, by a generation module of the computing device, an entitlement identifier via application of one or more hashing algorithms to the entitlement certificate, wherein transmitting the signed entitlement certificate further includes transmitting the generated entitlement identifier.

Exemplary Method for Receipt and Validation of Entitlement Certificates

Figure 8:
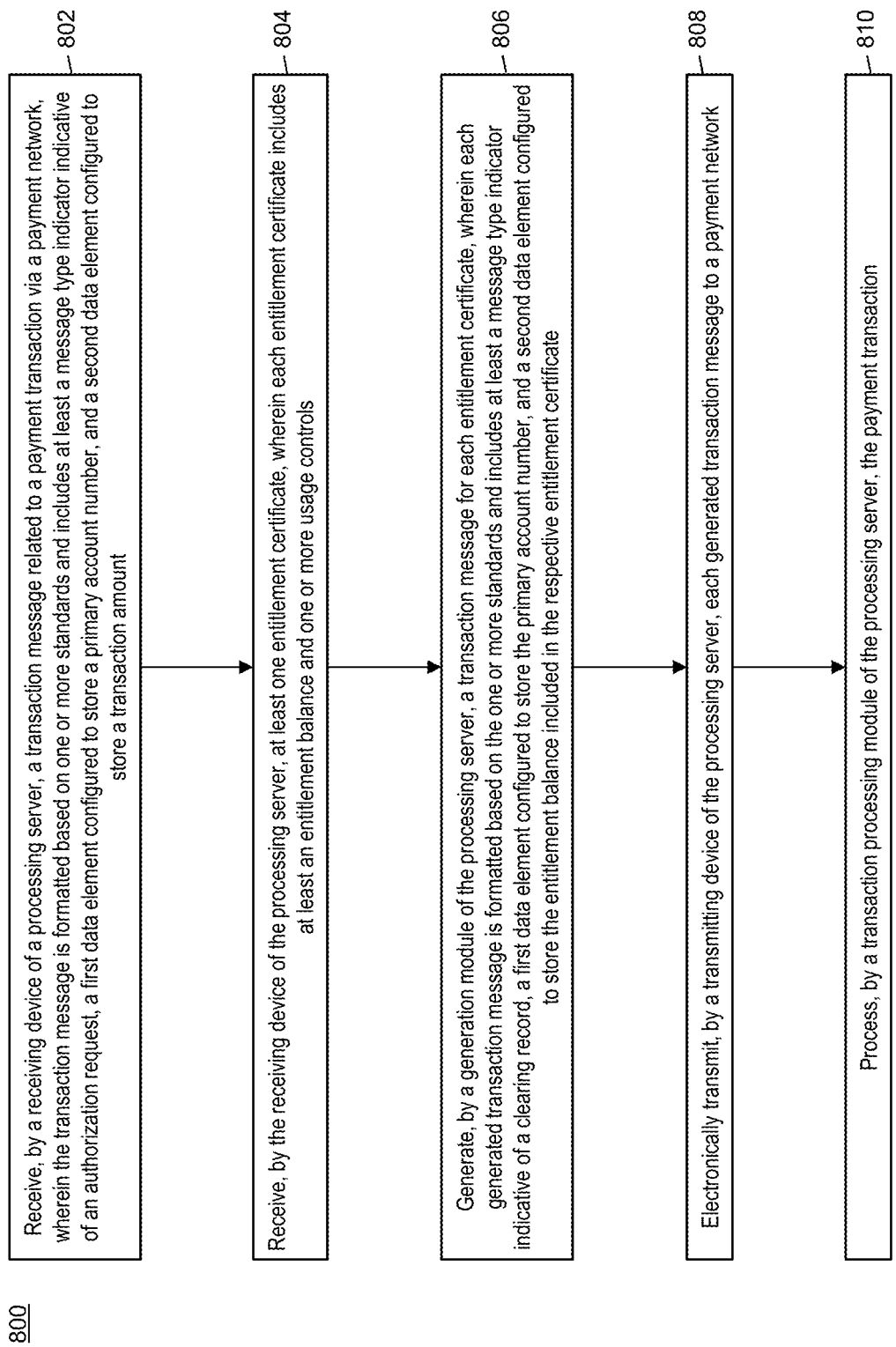
FIG. 8 is a flow chart illustrating an exemplary method for receipt and validation of entitlement certificates in accordance with exemplary embodiments.

FIG. 8 illustrates a method 800 for the receipt and validation of entitlement certificates by a processing server 112 for use in generating clearing records for release and transfer of funds associated with the entitlement certificate.

In step 802, a transaction message related to a payment transaction may be received via a payment network (e.g., the payment network 110) by a receiving device (e.g., the receiving device 402) of a processing server (e.g., the processing server 112), wherein the transaction message is formatted based on one or more standards and includes at least a message type indicator indicative of an authorization request, a first data element configured to store a primary account number, and a second data element configured to store a transaction amount. In step 804, at least one entitlement certificate may be received by the receiving device of the processing server, wherein each entitlement certificate includes at least an entitlement balance and one or more usage controls.

In step 806, a transaction message may be generated by a generation module (e.g., the generation module 416) of the processing server for each entitlement certificate, wherein each generated transaction message is formatted based on the one or more standards and includes at least a message type indicator indicative of a clearing record, a first data element configured to store the primary account number, and a second data element configured to store the entitlement balance included in the respective entitlement certificate. In step 808, each generated transaction message may be electronically transmitted by a transmitting device (e.g., the transmitting device 420) of the processing server to a payment network. In step 810, the payment transaction may be processed by a transaction processing module (e.g., the transaction processing module 418) of the processing server.

In one embodiment, each entitlement certificate may be signed and the method 800 may also include: storing, in a memory (e.g., the memory 422) of the processing server, a signature key; and validating, by a validation module (e.g., the validation module 417) of the processing server, each signed entitlement certificate using the stored signature key. In some embodiments, the at least one entitlement certificate may be stored in a third data element included in the received transaction message.

Payment Transaction Processing System and Process

Figure 9:
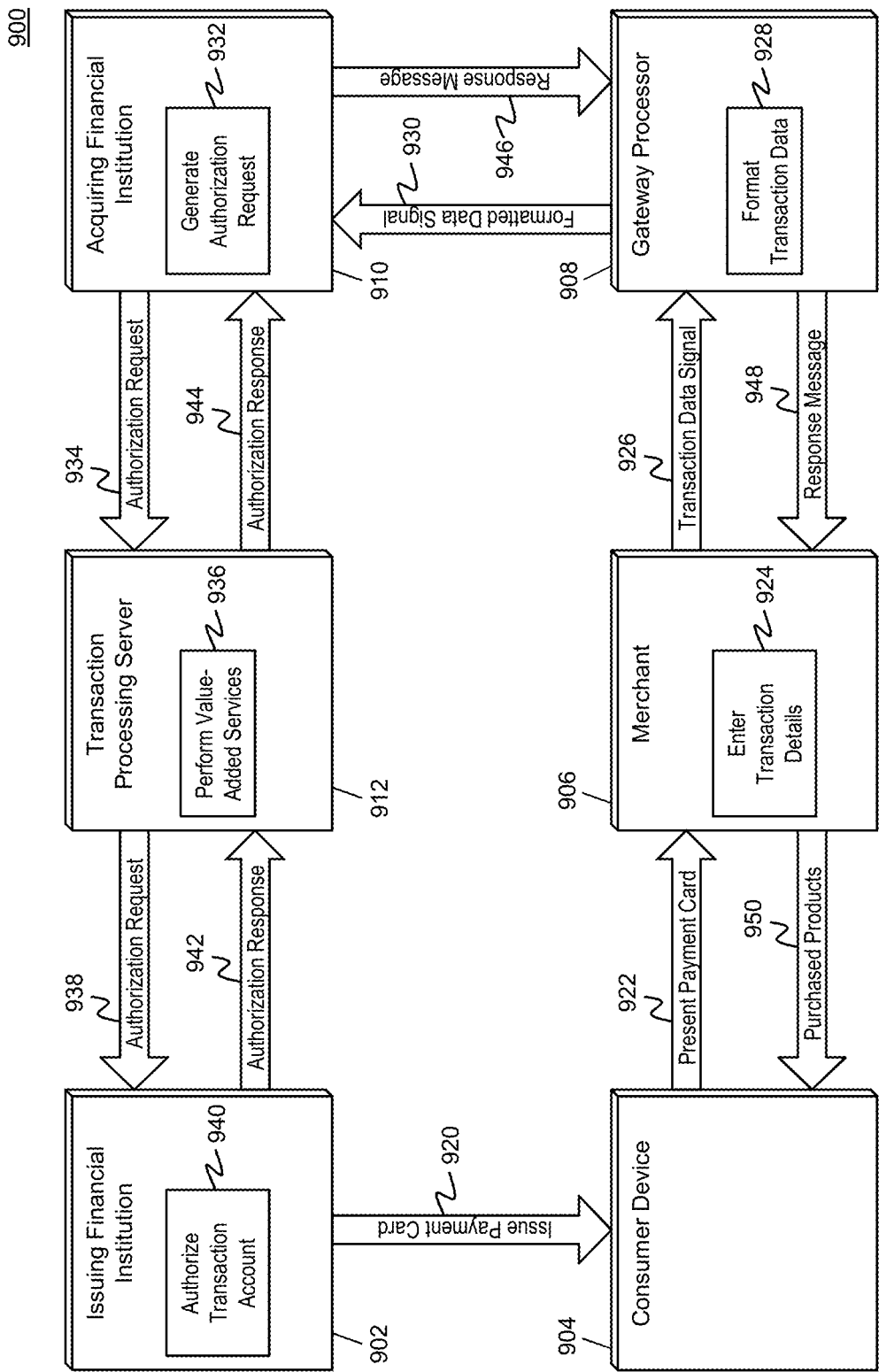
FIG. 9 is a flow diagram illustrating the processing of a payment transaction in accordance with exemplary embodiments.

FIG. 9 illustrates a transaction processing system and a process 900 for the processing of payment transactions in the system. The process 900 and steps included therein may be performed by one or more components of the system 100 discussed above, such as the issuer server 102, consumer 106, computing device 104, merchant system 108, payment network 110, processing server 112, etc. The processing of payment transactions using the system and process 900 illustrated in FIG. 9 and discussed below may utilize the payment rails, which may be comprised of the computing devices and infrastructure utilized to perform the steps of the process 900 as specially configured and programmed by the entities discussed below, including the transaction processing server 912, which may be associated with one or more payment networks configured to processing payment transactions. It will be apparent to persons having skill in the relevant art that the process 900 may be incorporated into the processes illustrated in FIGS. 5-8, discussed above, with respect to the step or steps involved in the processing of a payment transaction. In addition, the entities discussed herein for performing the process 900 may include one or more computing devices or systems configured to perform the functions discussed below. For instance, the merchant 906 may be comprised of one or more point of sale devices, a local communication network, a computing server, and other devices configured to perform the functions discussed below.

In step 920, an issuing financial institution 902 may issue a payment card or other suitable payment instrument to a consumer 904. The issuing financial institution may be a financial institution, such as a bank, or other suitable type of entity that administers and manages payment accounts and/or payment instruments for use with payment accounts that can be used to fund payment transactions. The consumer 904 may have a transaction account with the issuing financial institution 902 for which the issued payment card is associated, such that, when used in a payment transaction, the payment transaction is funded by the associated transaction account. In some embodiments, the payment card may be issued to the consumer 904 physically. In other embodiments, the payment card may be a virtual payment card or otherwise provisioned to the consumer 904 in an electronic format.

In step 922, the consumer 904 may present the issued payment card to a merchant 906 for use in funding a payment transaction. The merchant 906 may be a business, another consumer, or any entity that may engage in a payment transaction with the consumer 904. The payment card may be presented by the consumer 904 via providing the physical card to the merchant 906, electronically transmitting (e.g., via near field communication, wireless transmission, or other suitable electronic transmission type and protocol) payment details for the payment card, or initiating transmission of payment details to the merchant 906 via a third party. The merchant 906 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 924, the merchant 906 may enter transaction details into a point of sale computing system. The transaction details may include the payment details provided by the consumer 904 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 906 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 906 may be an online retailer in an e-commerce transaction. In such embodiments, the transaction details may be entered in a shopping cart or other repository for storing transaction data in an electronic transaction as will be apparent to persons having skill in the relevant art.

In step 926, the merchant 906 may electronically transmit a data signal superimposed with transaction data to a gateway processor 908. The gateway processor 908 may be an entity configured to receive transaction details from a merchant 906 for formatting and transmission to an acquiring financial institution 910. In some instances, a gateway processor 908 may be associated with a plurality of merchants 906 and a plurality of acquiring financial institutions 910. In such instances, the gateway processor 908 may receive transaction details for a plurality of different transactions involving various merchants, which may be forwarded on to appropriate acquiring financial institutions 910. By having relationships with multiple acquiring financial institutions 910 and having the requisite infrastructure to communicate with financial institutions using the payment rails, such as using application programming interfaces associated with the gateway processor 908 or financial institutions used for the submission, receipt, and retrieval of data, a gateway processor 908 may act as an intermediary for a merchant 906 to be able to conduct payment transactions via a single communication channel and format with the gateway processor 908, without having to maintain relationships with multiple acquiring financial institutions 910 and payment processors and the hardware associated thereto. Acquiring financial institutions 910 may be financial institutions, such as banks, or other entities that administers and manages payment accounts and/or payment instruments for use with payment accounts. In some instances, acquiring financial institutions 910 may manage transaction accounts for merchants 906. In some cases, a single financial institution may operate as both an issuing financial institution 902 and an acquiring financial institution 910.

The data signal transmitted from the merchant 906 to the gateway processor 908 may be superimposed with the transaction details for the payment transaction, which may be formatted based on one or more standards. In some embodiments, the standards may be set forth by the gateway processor 908, which may use a unique, proprietary format for the transmission of transaction data to/from the gateway processor 908. In other embodiments, a public standard may be used, such as the International Organization for Standardization's ISO 8983 standard. The standard may indicate the types of data that may be included, the formatting of the data, how the data is to be stored and transmitted, and other criteria for the transmission of the transaction data to the gateway processor 908.

In step 928, the gateway processor 908 may parse the transaction data signal to obtain the transaction data superimposed thereon and may format the transaction data as necessary. The formatting of the transaction data may be performed by the gateway processor 908 based on the proprietary standards of the gateway processor 908 or an acquiring financial institution 910 associated with the payment transaction. The proprietary standards may specify the type of data included in the transaction data and the format for storage and transmission of the data. The acquiring financial institution 910 may be identified by the gateway processor 908 using the transaction data, such as by parsing the transaction data (e.g., deconstructing into data elements) to obtain an account identifier included therein associated with the acquiring financial institution 910. In some instances, the gateway processor 908 may then format the transaction data based on the identified acquiring financial institution 910, such as to comply with standards of formatting specified by the acquiring financial institution 910. In some embodiments, the identified acquiring financial institution 910 may be associated with the merchant 906 involved in the payment transaction, and, in some cases, may manage a transaction account associated with the merchant 906.

In step 930, the gateway processor 908 may electronically transmit a data signal superimposed with the formatted transaction data to the identified acquiring financial institution 910. The acquiring financial institution 910 may receive the data signal and parse the signal to obtain the formatted transaction data superimposed thereon. In step 932, the acquiring financial institution may generate an authorization request for the payment transaction based on the formatted transaction data. The authorization request may be a specially formatted transaction message that is formatted pursuant to one or more standards, such as the ISO 8983 standard and standards set forth by a payment processor used to process the payment transaction, such as a payment network. The authorization request may be a transaction message that includes a message type indicator indicative of an authorization request, which may indicate that the merchant 906 involved in the payment transaction is requesting payment or a promise of payment from the issuing financial institution 902 for the transaction. The authorization request may include a plurality of data elements, each data element being configured to store data as set forth in the associated standards, such as for storing an account number, application cryptogram, transaction amount, issuing financial institution 902 information, etc.

In step 934, the acquiring financial institution 910 may electronically transmit the authorization request to a transaction processing server 912 for processing. The transaction processing server 912 may be comprised of one or more computing devices as part of a payment network configured to process payment transactions. In some embodiments, the authorization request may be transmitted by a transaction processor at the acquiring financial institution 910 or other entity associated with the acquiring financial institution. The transaction processor may be one or more computing devices that include a plurality of communication channels for communication with the transaction processing server 912 for the transmission of transaction messages and other data to and from the transaction processing server 912. In some embodiments, the payment network associated with the transaction processing server 912 may own or operate each transaction processor such that the payment network may maintain control over the communication of transaction messages to and from the transaction processing server 912 for network and informational security.

In step 936, the transaction processing server 912 may perform value-added services for the payment transaction. Value-added services may be services specified by the issuing financial institution 902 that may provide additional value to the issuing financial institution 902 or the consumer 904 in the processing of payment transactions. Value-added services may include, for example, fraud scoring, transaction or account controls, account number mapping, offer redemption, loyalty processing, etc. For instance, when the transaction processing server 912 receives the transaction, a fraud score for the transaction may be calculated based on the data included therein and one or more fraud scoring algorithms and/or engines. In some instances, the transaction processing server 912 may first identify the issuing financial institution 902 associated with the transaction, and then identify any services indicated by the issuing financial institution 902 to be performed. The issuing financial institution 902 may be identified, for example, by data included in a specific data element included in the authorization request, such as an issuer identification number. In another example, the issuing financial institution 902 may be identified by the primary account number stored in the authorization request, such as by using a portion of the primary account number (e.g., a bank identification number) for identification.

In step 938, the transaction processing server 912 may electronically transmit the authorization request to the issuing financial institution 902. In some instances, the authorization request may be modified, or additional data included in or transmitted accompanying the authorization request as a result of the performance of value-added services by the transaction processing server 912. In some embodiments, the authorization request may be transmitted to a transaction processor (e.g., owned or operated by the transaction processing server 912) situated at the issuing financial institution 902 or an entity associated thereof, which may forward the authorization request to the issuing financial institution 902.

In step 940, the issuing financial institution 902 may authorize the transaction account for payment of the payment transaction. The authorization may be based on an available credit amount for the transaction account and the transaction amount for the payment transaction, fraud scores provided by the transaction processing server 912, and other considerations that will be apparent to persons having skill in the relevant art. The issuing financial institution 902 may modify the authorization request to include a response code indicating approval (e.g., or denial if the transaction is to be denied) of the payment transaction. The issuing financial institution 902 may also modify a message type indicator for the transaction message to indicate that the transaction message is changed to be an authorization response. In step 942, the issuing financial institution 902 may transmit (e.g., via a transaction processor) the authorization response to the transaction processing server 912.

In step 944, the transaction processing server 912 may forward the authorization response to the acquiring financial institution 910 (e.g., via a transaction processor). In step 946, the acquiring financial institution may generate a response message indicating approval or denial of the payment transaction as indicated in the response code of the authorization response, and may transmit the response message to the gateway processor 908 using the standards and protocols set forth by the gateway processor 908. In step 948, the gateway processor 908 may forward the response message to the merchant 906 using the appropriate standards and protocols. In step 950, assuming the transaction was approved, the merchant 906 may then provide the products purchased by the consumer 904 as part of the payment transaction to the consumer 904.

In some embodiments, once the process 900 has completed, payment from the issuing financial institution 902 to the acquiring financial institution 910 may be performed. In some instances, the payment may be made immediately or within one business day. In other instances, the payment may be made after a period of time, and in response to the submission of a clearing request from the acquiring financial institution 910 to the issuing financial institution 902 via the transaction processing server 902. In such instances, clearing requests for multiple payment transactions may be aggregated into a single clearing request, which may be used by the transaction processing server 912 to identify overall payments to be made by whom and to whom for settlement of payment transactions.

In some instances, the system may also be configured to perform the processing of payment transactions in instances where communication paths may be unavailable. For example, if the issuing financial institution 902 is unavailable to perform authorization of the transaction account (e.g., in step 940), the transaction processing server 912 may be configured to perform authorization of transactions on behalf of the issuing financial institution 902. Such actions may be referred to as "stand-in processing," where the transaction processing server "stands in" as the issuing financial institution 902. In such instances, the transaction processing server 912 may utilize rules set forth by the issuing financial institution 902 to determine approval or denial of the payment transaction, and may modify the transaction message accordingly prior to forwarding to the acquiring financial institution 910 in step 944. The transaction processing server 912 may retain data associated with transactions for which the transaction processing server 912 stands in, and may transmit the retained data to the issuing financial institution 902 once communication is reestablished. The issuing financial institution 902 may then process transaction accounts accordingly to accommodate for the time of lost communication.

In another example, if the transaction processing server 912 is unavailable for submission of the authorization request by the acquiring financial institution 910, then the transaction processor at the acquiring financial institution 910 may be configured to perform the processing of the transaction processing server 912 and the issuing financial institution 902. The transaction processor may include rules and data suitable for use in making a determination of approval or denial of the payment transaction based on the data included therein. For instance, the issuing financial institution 902 and/or transaction processing server 912 may set limits on transaction type, transaction amount, etc. that may be stored in the transaction processor and used to determine approval or denial of a payment transaction based thereon. In such instances, the acquiring financial institution 910 may receive an authorization response for the payment transaction even if the transaction processing server 912 is unavailable, ensuring that transactions are processed and no downtime is experienced even in instances where communication is unavailable. In such cases, the transaction processor at the acquiring financial institution 910 may store transaction details for the payment transactions, which may be transmitted to the transaction processing server 912 (e.g., and from there to the associated issuing financial institutions 902) once communication between the acquiring financial institution 910 and transaction processing server 912 is reestablished.

In some embodiments, transaction processors may be configured to include a plurality of different communication channels, which may utilize multiple communication cards and/or devices, to communicate with the transaction processing server 912 for the sending and receiving of transaction messages. For example, a transaction processor may be comprised of multiple computing devices, each having multiple communication ports that are connected to the transaction processing server 912. In such embodiments, the transaction processor may cycle through the communication channels when transmitting transaction messages to the transaction processing server 912, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 910 may identify that an authorization request involves an issuing financial institution 902 (e.g., via the bank identification number included in the transaction message) for which no value-added services are required. The transaction processor at the acquiring financial institution 910 may then transmit the authorization request directly to the transaction processor at the issuing financial institution 902 (e.g., without the authorization request passing through the transaction processing server 912), where the issuing financial institution 902 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 912 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 908, acquiring financial institution 910, etc.) for processing using this advanced network, and to quickly and efficiently receive a response regarding the ability for a consumer 904 to fund the payment transaction.

Computer System Architecture

Figure 10:
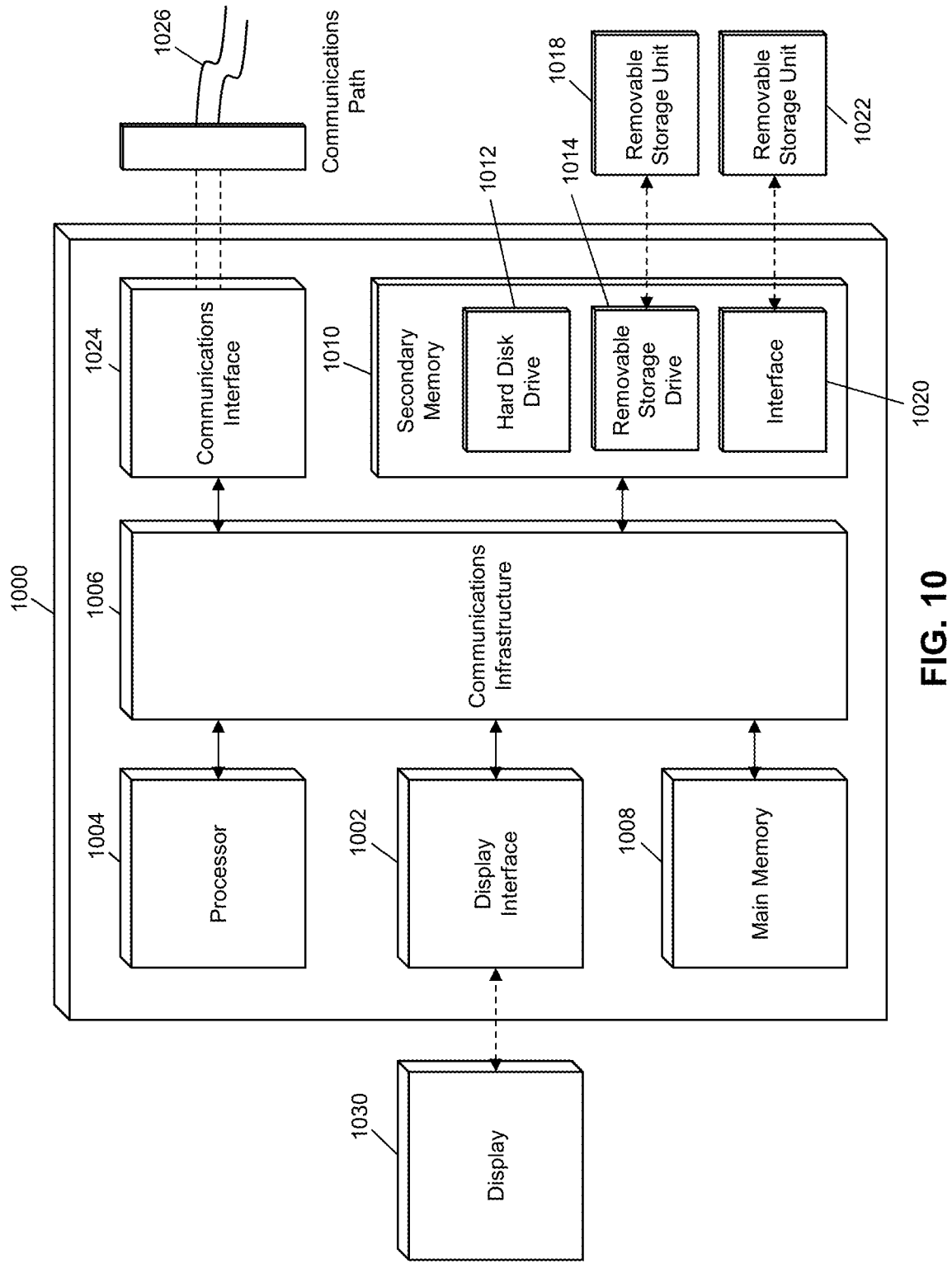
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the issuer server 102, computing device 104, and processing server 112 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5-9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 5-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, systems and methods for generation, distribution, transfer, receipt, validation, and use of entitlement certificates. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for distribution and transfer of entitlement certificates, comprising:
   electronically issuing, by an issuer server, respective payment credentials to a plurality of computing devices of consumers, wherein said payment credentials are associated with respective transaction accounts;
   storing, in an account database of an issuer server, a plurality of account profiles, wherein each account profile includes at least an account identifier, a primary account number of an associated transaction account, an account balance of the associated transaction account, and a public key of an associated computing device;
   receiving, by a receiving device of the issuer server, a data signal superimposed with an entitlement request from a computing device of a consumer, from the plurality of computing devices, via a communication network, wherein the entitlement request includes at least a specific account identifier, entitlement balance, and one or more usage controls;
   executing, by a querying module of the issuer server, a first query on the account database and identifying a specific account profile where the account identifier included in the specific account profile corresponds to the specific account identifier included in the received entitlement request;
   generating, by a generation module of the issuer server, an entitlement certificate based on at least the entitlement balance and the one or more usage controls included in the received entitlement request;
   generating, by a generation module of the issuer server, an entitlement identifier by applying at least one hashing algorithm to the generated entitlement certificate;
   executing, by the querying module of the issuer server, a second query on the account database and, in response to said executed query, (i) placing a hold associated with the entitlement certificate on the account balance of the associated transaction account included in the specific account profile for at least the entitlement balance, and (ii) inserting the generated entitlement identifier into the specific account profile;
   electronically transmitting, by a transmitting device of the issuer server, via the communication network, a data signal superimposed with the entitlement certificate to the computing device of the consumer;
   receiving, by the issuer server, from a payment network via payment rails associated with the payment network, a digitally signed entitlement certificate for transfer of funds associated with the entitlement balance, and
   validating, by a validation module of the issuer server, the digitally signed entitlement certificate using a public key of the computing device of the consumer stored in the database.

2. The method of claim 1, wherein
   the receiving, by the issuer server, of the entitlement certificate from the payment network includes receiving a transaction message, wherein the transaction message is formatted based on one or more standards and includes at least a message type indicator indicative of a clearing record, a first data element configured to store the primary account number included in the specific account profile, and a second data element configured to store the generated entitlement identifier; and executing, by the querying module of the processing server, a third query on the account profile to release the hold associated with the entitlement certificate on the account balance.

3. The method of claim 1, wherein the transmitting, by the issuer server, of the generated entitlement certificate, includes transmitting the entitlement certificate to the computing device, via a secondary device in communication with the computing device.

4. A system for distribution and transfer of entitlement certificates, comprising:

a transmitting device of an issuer server configured to issue respective payment credentials to a plurality of computing devices of consumers, wherein said payment credentials are associated with respective transaction accounts;

an account database of the issuer server configured to store a plurality of account profiles, wherein each account profile includes at least an account identifier, a primary account number of an associated transaction account, an account balance of the associated transaction account, and a public key of an associated computing device;

a receiving device of the issuer server configured to receive a data signal superimposed with an entitlement request from a computing device of a consumer, from the plurality of computing devices, via communication network, wherein the entitlement request includes at least a specific account identifier, entitlement balance, and one or more usage controls;

a querying module of the issuer server configured to execute a first query on the account database and identify a specific account profile where the account identifier included in the specific account profile corresponds to the specific account identifier included in the received entitlement request;

a generation module of the issuer server configured to generate an entitlement certificate based on at least the entitlement balance and the one or more usage controls included in the received entitlement request, and an entitlement identifier for the generated entitlement certificate by applying at least one hashing algorithm to the generated entitlement certificate, and a validation module of the issuer server, wherein the querying module of the issuer server is further configured to execute a second query on the account database and, in response to said executed query, the issuer server (i) places a hold associated with the entitlement certificate on the account balance included in the specific account profile for at least the entitlement balance, and (ii) inserts the generated entitlement identifier into the specific account profile, the transmitting device of the issuer server is further configured to electronically transmit, via the communication network, a data signal superimposed with the entitlement certificate to the computing device of the consumer, the receiving device of the issuer server is further configured to receive, from a payment network, via payment rails associated with the payment network, a digitally signed entitlement certificate for transfer of funds associated with the entitlement balance, and the validation module of the issuer server is configured to validate the digitally signed entitlement certificate using a public key of the computing of the consumer stored in the database.

5. The system of claim 4, wherein the receiving device of the processing server is further configured to receive, along with the entitlement certificate received from the payment network, a transaction message from the payment network, wherein the transaction message is formatted based on one or more standards and includes at least a message type indicator indicative of a clearing record, a first data element configured to store the primary account number included in the specific account profile, and a second data element configured to store the generated entitlement identifier, and the querying module of the processing server is further configured to execute a third query on the account profile to release the hold associated with the entitlement certificate on the account balance.

6. The system of claim 4, wherein the issuer transmits the entitlement certificate to the computing device via a secondary computing device in communication with the computing device.

* * * * *